US012050646B2

(12) United States Patent
Tan et al.

(10) Patent No.: US 12,050,646 B2
(45) Date of Patent: Jul. 30, 2024

(54) PROXIMITY GRAPH MAINTENANCE FOR FAST ONLINE NEAREST NEIGHBOR SEARCH

(71) Applicant: Baidu USA, LLC, Sunnyvale, CA (US)

(72) Inventors: Shulong Tan, Mountain View, CA (US); Zhaozhuo Xu, Houston, TX (US); Weijie Zhao, Sunnyvale, CA (US); Zhixin Zhou, Los Angeles, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 221 days.

(21) Appl. No.: 17/408,146

(22) Filed: Aug. 20, 2021

(65) Prior Publication Data

US 2023/0077267 A1 Mar. 9, 2023

(51) Int. Cl.
G06F 16/901 (2019.01)
G06F 16/22 (2019.01)

(52) U.S. Cl.
CPC ...... G06F 16/9024 (2019.01); G06F 16/2272 (2019.01)

(58) Field of Classification Search
None
See application file for complete search history.

(56) References Cited

U.S. PATENT DOCUMENTS

2014/0354649 A1* 12/2014 Aksu ............... G06Q 50/01
345/440
2015/0370838 A1* 12/2015 Paradies ........... G06F 16/9024
707/738
2018/0246987 A1* 8/2018 Das ............... G06F 16/9024

OTHER PUBLICATIONS

Singh, Aditi, et al. "Fresh DiskANN: A Fast and Accurate Graph-Based ANN Index for Streaming Similarity Search." arXiv preprint arXiv:2105.09613 (2021). (Year: 2021).*
Vanderkam et al.,"Nearest Neighbor Search in Google Correlate," 2013, [online], [Retrieved Aug. 24, 2023]. Retrieved from Internet <URL: https://static.googleusercontent.com/media/research.google.com/en//pubs/archive/41694.pdf> (8pgs).
Webb et al., "Introducing the Webb Spam Corpus: Using Email Spam to Identify Web Spam Automatically," In CEAS 2006, Third Conference on Email & Anti-Spam, 2006. (9pgs).
Xu et al.,"Online product quantization," arXiv preprint arXiv:1711.10775, 2018. (14pgs).
Xu et al., "Deep Learning for Matching in Search and Recommendation," In WWW Tutorials, 2018. (4pgs).
Yang et al.,"Smart hashing update for fast response," In Twenty-Third International Joint Conference on Artificial Intelligence, 2013. (7pgs).

(Continued)

Primary Examiner — Alex Gofman
Assistant Examiner — Umar Mian
(74) Attorney, Agent, or Firm — NORTH WEBER & BAUGH LLP

(57) ABSTRACT

Incremental proximity graph maintenance (IPGM) systems and methods for online ANN search support both online vertex deletion and insertion of vertices on proximity graphs. In various embodiments, updating a proximity graph comprises receiving a workload that represents a set of vertices in the proximity graph, each vertex being associated with a type of operation such as a query, insertion, or deletion. For a query or an insertion, a search may be executed on the graph to obtain a set of top-K vertices for each vertex. In the case of a deletion, a vertex may be deleted from the proximity graph, and a local or global reconnection update method may be used to reconstruct at least a portion of the proximity graph.

19 Claims, 14 Drawing Sheets

(56) References Cited

OTHER PUBLICATIONS

Zhang et al.,"Composite Quantization for Approximate Nearest Neighbor Search," In Proc. of the 31st International Conf. on Machine Learning, ICML, 2014. (9pgs).
Zhou et al., "Möbius Transformation for Fast Inner Product Search on Graph," In Advances in Neural Information Processing Systems, 2019. (12 pgs).
Faithfull et al.,"ANN Benchmarks," [online], [Retrieved Aug. 24, 2023]. Retrieved from Internet <URL: https://github.com/erikbern/ann-benchmarks> (18 pgs).
Fan et al., "MOBIUS: Towards the Next Generation of Query-Ad Matching in Baidu's Sponsored Search," In Proceedings of: the 25th ACM SIGKDD International Conference on Knowledge Discovery & Data Mining. ACM, 2019. (9pgs).
Fu et al., "Efanna: An extremely fast approximate nearest neighbor search algorithm based on knn graph," arXiv preprint arXiv:1609.07228, 2016. (20pgs).
Ge et al.,"Optimized product quantization," IEEE transactions on pattern analysis & machine intelligence, 2013. (14pgs).
Ghashami et al., "Binary coding in stream," arXiv preprint arXiv:1503.06271, 2015. (9pgs).
Gionis et al.,"Similarity search in high dimensions via hashing," In Proceedings of the 25th VLDB Conference, 1999. (12pgs).
John Guare, "Six degrees of separation: A play," New York, Vintage Books,1990. (25pgs).
Hajebi et al.,"Fast approximate nearest-neighbor search with k-nearest neighbor graph," In 22nd International Joint Conference on Artificial Intelligence, 2011. (7pgs).
Jegou et al., "Product quantization for nearest neighbor search," IEEE transactions on pattern analysis & machine intelligence, 2010. (14pgs).
G. Navarro, "Searching in metric spaces by spatial approximation," The VLDB Journal 11: 28-46 (2002), 2002. (19pgs).
Pazzani et al., "Content-based recommendation systems," In The adaptive web, Springer, 325-341, 2007. (17pgs).
Pennington et al.,"Glove:Global vectors for word representation," In Proc. of the 2014 conference on empirical methods in natural language processing (EMNLP), 2014. (12pgs).
L. Prokhorenkova, "Graph-based Nearest Neighbor Search: From Practice to Theory," arXiv preprint arXiv:1907.00845, 2020. (31pgs).
Ram et al.,"Revisiting kd-tree for Nearest Neighbor Search," In Proc. of the 25th ACM SIGKDD International Conference on Knowledge Discovery & Data Mining, ACM, 2019. (11pgs).
Sandhawalia et al.,"Searching with expectations," In 2010 IEEE International Conference on Acoustics, Speech & Signal Processing, IEEE, 2010. (5pgs).
Shrivastava et al.,"In Defense of Minhash over Simhash," In Artificial Intelligence and Statistics, 2014. (9 pgs).
Tan et al.,"On efficient retrieval of top similarity vectors," In Proc. of the 2019 Conference on Empirical Methods in Natural Language Processing & the 9th International Joint Conference on Natural Language Processing (EMNLP-IJCNLP), 2019. (11psg).
Tan et al.,"Fast item ranking under neural network based measures," In Proceedings of the 13th International Conference on Web Search & Data Mining, 2020. (9pgs).
Babenko et al., "Additive quantization for extreme vector compression," In Proceedings of the IEEE Conference on Computer Vision & Pattern Recognition, 2014. (8pgs).
Beaumont et al.,"Peer to peer multidimensional overlays: Approximating complex structures," In International Conference On Principles Of Distributed Systems, 2007. (18pgs).
Cakir et al.,"Online supervised hashing," Computer Vision & Image Understanding, 2016. (12pgs).
Coleman et al.,"RACE:Sub-Linear Memory Sketches for Approximate Near-Neighbor Search on Streaming Data," arXiv preprint arXiv:1902.06687, 2019. (21pgs).
Dasgupta et al.,"Random projection trees and low dimensional manifolds," Citeseer, 2008. (10pgs).
Datar et al.,"Locality-Sensitive hashing scheme based on p-Stable distributions," In Proceedings of the 20th annual symposium on Computational geometry, ACM, 2004. (10pgs).
Dave et al.,"Learning the click-through rate for rare/new ads from similar ads," In Proceedings of the 33rd international ACM SIGIR conference on Research & development in information retrieval, ACM, 2010. (4pgs).
Dong et al.,"Efficient k-nearest neighbor graph construction for generic similarity measures," In Proc. of the 20th international conf. on World wide web, ACM, 2011. (10pgs).
Dua et al.,"UCI Machine Learning Repository," [online], [Retrieved Aug. 24, 2023] Retrieved from Internet <URL: http://archive.ics.uci.edu/ml> (2pgs).
Jégou et al.,"Searching in one billion vectors: re-rank with source coding," arXiv preprint arXiv: 1102.3828, 2011. (4pgs).
T. Laarhoven, "Graph-based time-space trade-offs for approximate near neighbors," arXiv preprint arXiv:1712.03158, 2017. (26pgs).
Leng et al.,"Online sketching hashing," In Proceedings of the IEEE conference on computer vision & pattern recognition (CVPR), 2015. (9 pgs).
Ma et al.,"Identifying suspicious URLs: an application of large-scale online learning," In Proc. of the 26th annual international conference on machine learning, 2009. (8pgs).
Malkov et al.,"Scalable distributed algorithm for approximate nearest neighbor search problem in high dimensional general metric spaces,"In International Conference on Similarity Search & Applications, Springer, 2012. (16pgs).
Malkov et al.,"Approximate nearest neighbor algorithm based on navigable small world graphs," Information Systems 45 (2014) 61-68, 2014. (10pgs).
Malkov et al.,"Efficient and robust approximate nearest neighbor search using hierarchical navigable small world graphs," IEEE transactions on pattern analysis and machine intelligence, 2018. (13pgs).
Morozov et al.,"Non-metric similarity graphs for maximum inner product search," In Advances in Neural Information Processing Systems, 2018. (10pgs).
Li et al.,"Consistent sampling through extremal process," In Proceedings of the Web Conference (WWW), 2021. (11pgs).
X. Li et al.,"Random projections with asymmetric quantization," In Advances in Neural Information Processing Systems (NeurIPS), 2019. (10pgs).
King-Ip Lin et al.,"The TV-tree: An index structure for highdimensional data," VLDB J., 3(4):517-542, 1994. (26pgs).
Liong et al.,"Deep hashing for compact binary codes learning," In Proceedings of the IEEE Conference on Computer Vision & Pattern Recognition (CVPR), 2015. (9pgs).
Paredes et al.,"Using the k-nearest neighbor graph for proximity searching in metric spaces," In Proceedings of the 12th International Conference on String Processing and Information Retrieval (SPIRE), 2005. (12pgs).
Sakurai et al.,"The A-tree: An index structure for high-dimensional spaces using relative approximation," In Proceedings of 26th International Conference on Very Large Data Bases (VLDB), 2000. (11pgs).
Shen et al.,"Supervised Discrete Hashing," In Proceedings of the IEEE Conference on Computer Vision and Pattern Recognition (CVPR), 2015. (9pgs).
Shrivastava et al.,"Fast near neighbor search in high-dimensional binary data," In Proceedings of the European Conference on Machine Learning & Knowledge Discovery in Databases (ECML-PKDD), 2012. (16 pgs).
Singh et al.,"FreshDiskANN: A fast and accurate graph-based ann index for streaming similarity search," arXiv preprint arXiv:2105.09613, 2021. (19 pgs).
Tan et al.,"Norm adjusted proximity graph for fast inner product retrieval," In Proc. of the 27th ACM SIGKDD Conf. on Knowledge Discovery & Data Mining (KDD), 2021 9pgs).
Tan et al.,"Fast neural ranking on bipartite graph indices," Proc. VLDB Endow., 15(4):794-803, 2021b. (10pgs).
Wei et al.,"Scalable heterogeneous translated hashing," In Proceedings of the 20th ACM SIGKDD International Conference on Knowledge Discovery & Data Mining (KDD), 2014. (10pgs.

(56) References Cited

OTHER PUBLICATIONS

Weiss et al.,"Spectral hashing," In Advances in Neural Information Processing Systems (NIPS), 2008. (8pgs).

Yu et al., "EGM: Enhanced graph-based model for large-scale video advertisement search," In Proc. of the 28th ACM SIGKDD Intr. Conf. on Knowledge Discovery & Data Mining (KDD), 2022. (9 pgs).

Zezula et al., "Approximate similarity retrieval with M-trees," VLDB J., 7(4):275-293, 1998. (19pgs).

Zhao et al., "SONG: approximate nearest neighbor search on GPU," In Proceedings of the 36th IEEE International Conference on Data Engineering (ICDE), 2020. (12pgs).

André et al.,"Cache locality is not enough: High-performance nearest neighbor search with product quantization fast scan," Proc. VLDB Endow., 9(4):288-299, 2015. (13pgs).

Berchtold et al.,"The X-tree : An index structure for high-dimensional data," In Proceedings of 22th International Conference on Very Large Data Bases (VLDB), 1996. (12 pgs).

Andrei Z. Broder, "On the resemblance and containment of documents," In Proceedings of the Conference on Compression and Complexity of SEQUENCES, 1997 (9pgs).

Broder et al., "Min-wise independent permutations," In Proceedings of the Thirtieth Annual ACM Symposium on the Theory of Computing (STOC), 1998. (10pgs).

Cao et al., "Deep quantization network for efficient image retrieval," In Proceedings of the Thirtieth AAAI Conference on Artificial Intelligence (AAAI), 2016. (7pgs).

M. S. Charikar, "Similarity estimation techniques from rounding algorithms," In Proceedings on 34th Annual ACM Symposium on Theory of Computing (STOC), 2002. (9pgs).

Friedman et al.,"An algorithm for finding nearest neighbors," IEEE Transactions on Computers, 24:1000-1006, 1975. (22pgs).

Friedman et al.,"An algorithm for finding best matches in logarithmic expected time," ACM Transactions on Mathematical Software, 3:209-226, 1977. (18pgs).

Fu et al.,"Fast approximate nearest neighbor search with the navigating spreading-out graph," Proc. VLDB Endow., 12(5):461-474, 2019. (14pgs).

Gao et al.,"Selective Hashing: Closing the Gap between Radius Search and k-NN Search," In Proc. of the 21th ACM SIGKDD Inter. Conf. on Knowledge Discovery & Data Mining (KDD), 2015. (10pgs).

W. Gao et al.,"Deep Retrieval: Learning a retrievable structure for large-scale recommendations," arXiv preprint arXiv:2007.07203, May 2021. (9pgs).

Indyk et al.,"Approximate nearest neighbors:Towards removing the curse of dimensionality," In Proc.of the13th Annual ACM Symposium on the Theory of Computing (STOC), 1998. (20p).

Frigyes Karinthy,"Chain-links," Everything is different,1929. (4pgs).

J. M. Kleinberg,"The small-world phenomenon: an algorithmic perspective," In Proceedings of the Thirty-Second Annual ACM Symposium on Theory of Computing (STOC), 2000. (8pgs).

Ping Li, "Several tunable GMM kernels," arXiv preprint arXiv:1805.02830, 2018. (9pgs).

Ping Li, "Sign-full random projections," arXiv preprint arXiv:1805.00533, 2018. (27pgs).

Li et al.,"Using sketches to estimate associations," In Proceedings of the Human Language Technology Conference and the Conference on Empirical Methods in Natural Language Processing (HLT/EMNLP), 2005. (8pgs).

Li et al.,"Theory of the GMM kernel," In Proceedings of the 26th International Conference on World Wide Web (WWW), 2017. (10pgs).

Zhu et al.,"Deep hashing network for efficient similarity retrieval," In Proceedings of the Thirtieth AAAI Conference on Artificial Intelligence (AAAI), 2016. (7pgs).

Zhu et al.,"Learning tree-based deep model for recommender systems," arXiv preprint arXiv:1801.02294, 2018. (10pgs).

Zhu et al.,"Joint optimization of tree-based index and deep model for recommender systems," arXiv preprint arXiv:1902.07565, 2019. (10pgs).

Zhuo et al.,"Learning optimal tree models under beam search," arXiv preprint arXiv:2006.15408, 2020. (20pgs).

\* cited by examiner

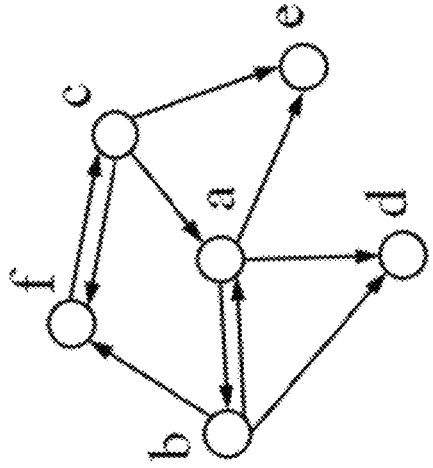
FIG. 1A Original Graph
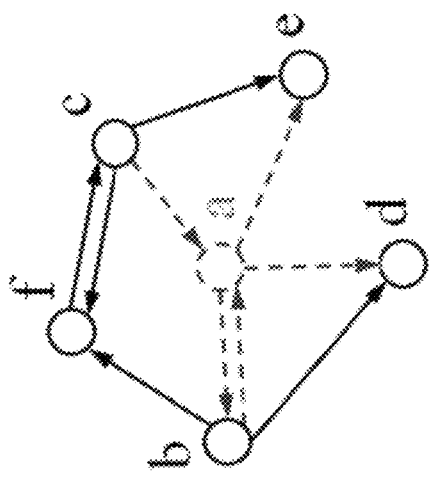
FIG. 1B Pure Deletion
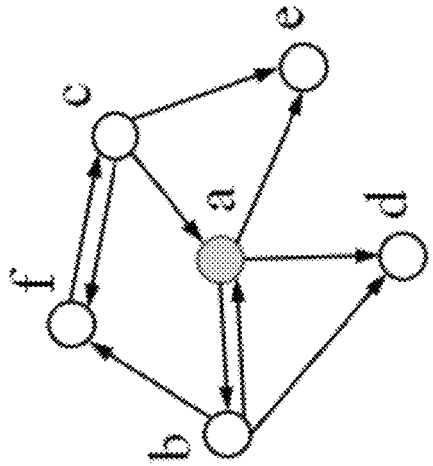
FIG. 1C Vertex Masking
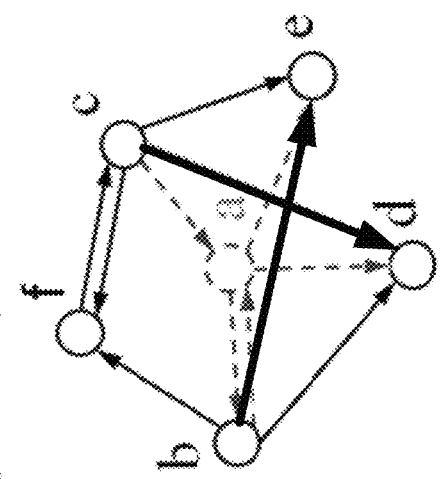
FIG. 1D Local Reconnection
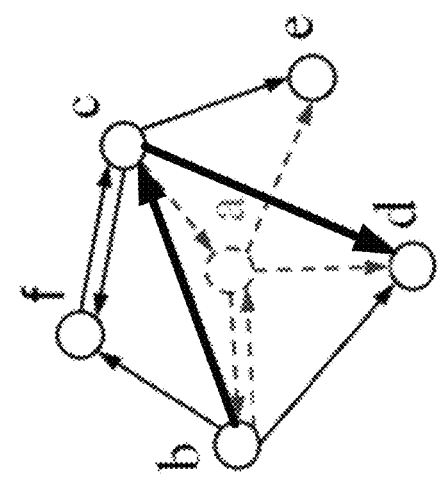
FIG. 1E Global Reconnection

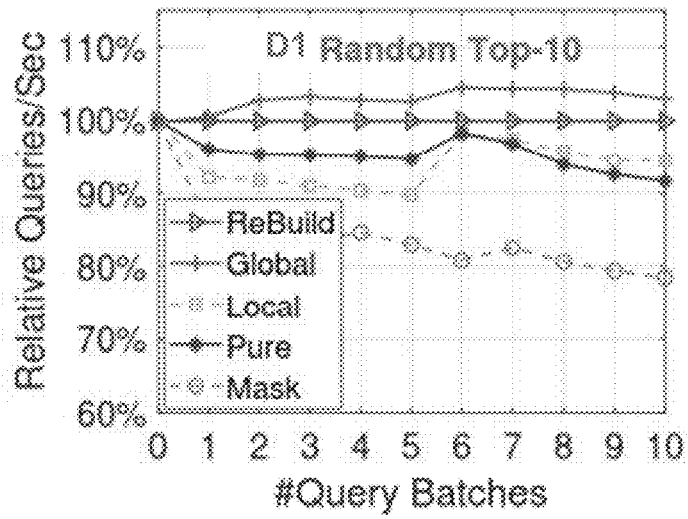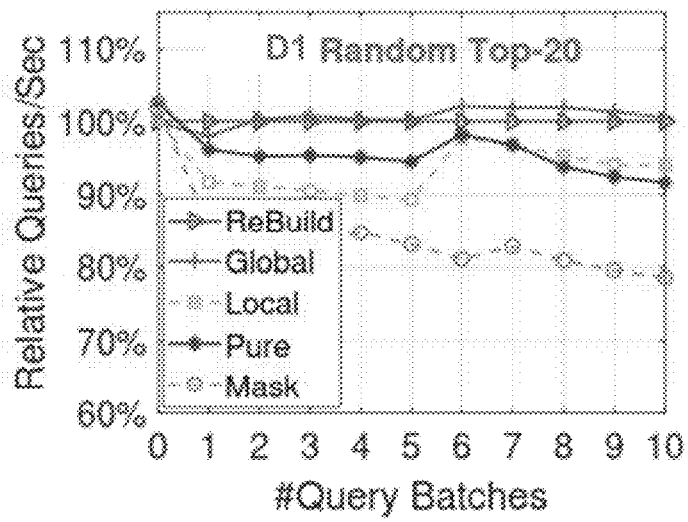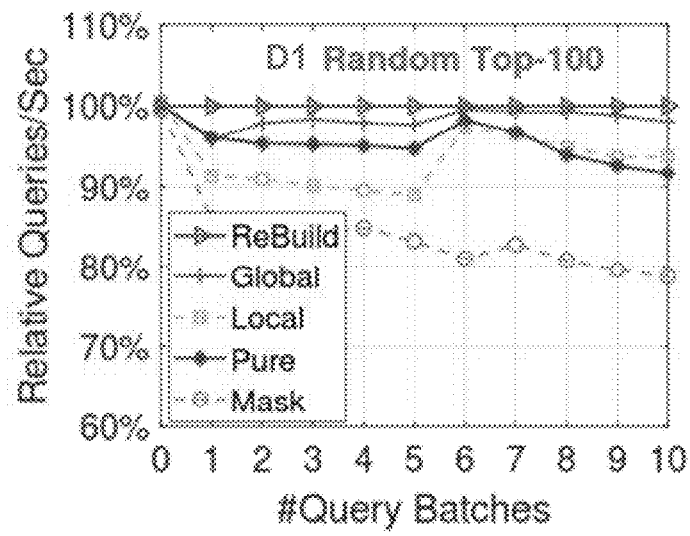
FIG. 2A

_210_
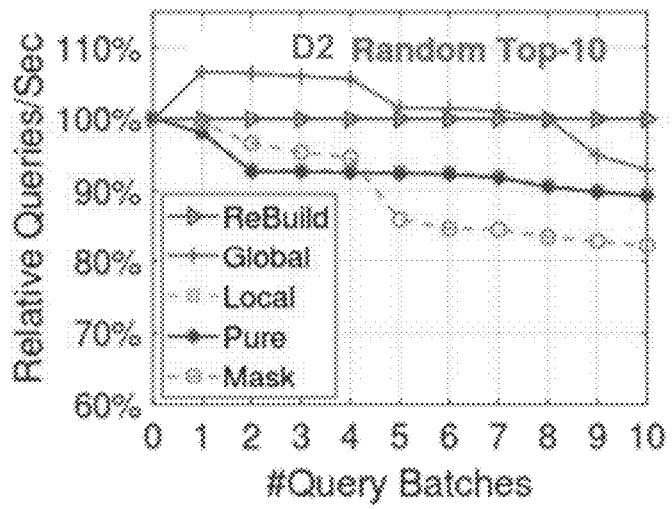
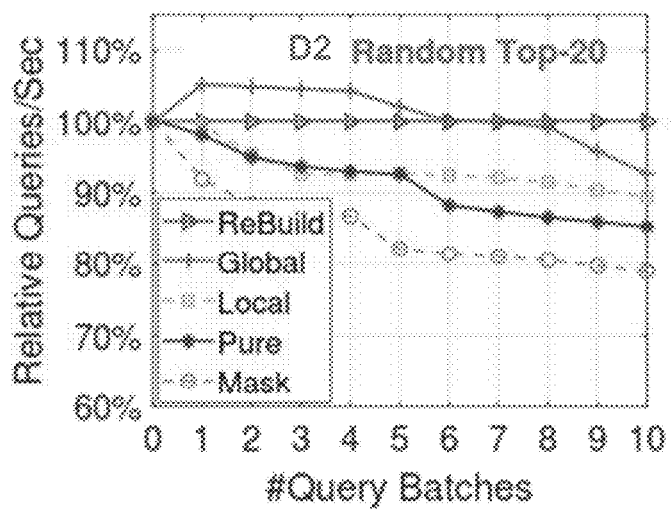
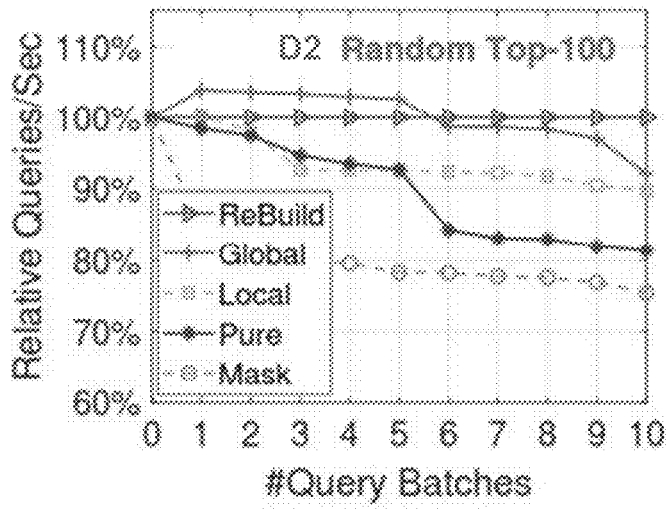
FIG. 2B

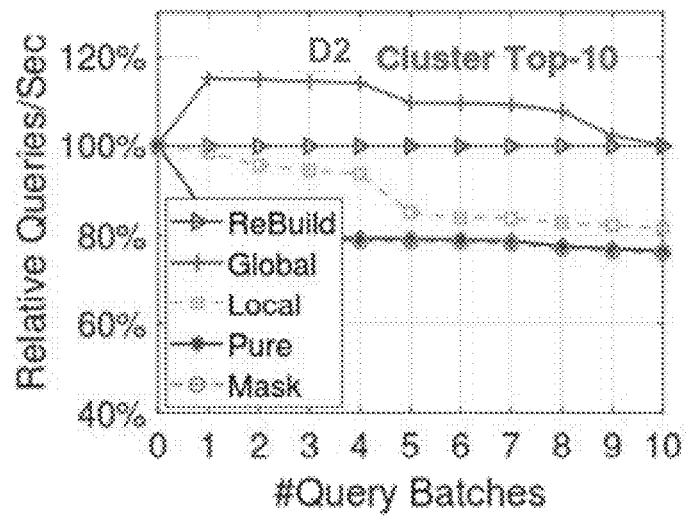
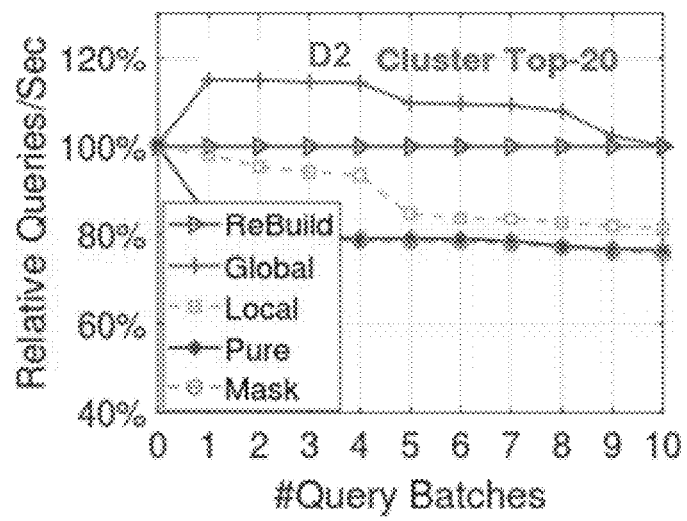
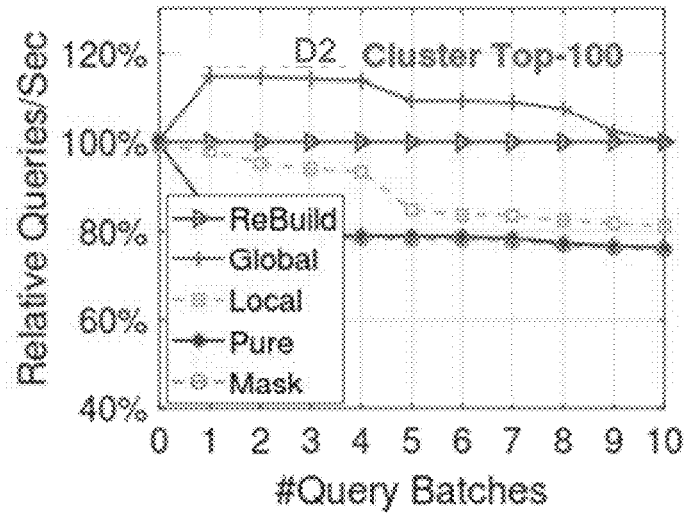
FIG. 4B

430
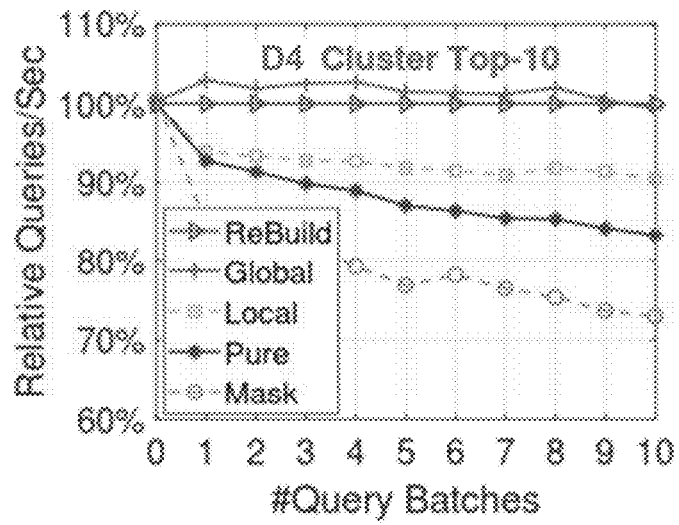
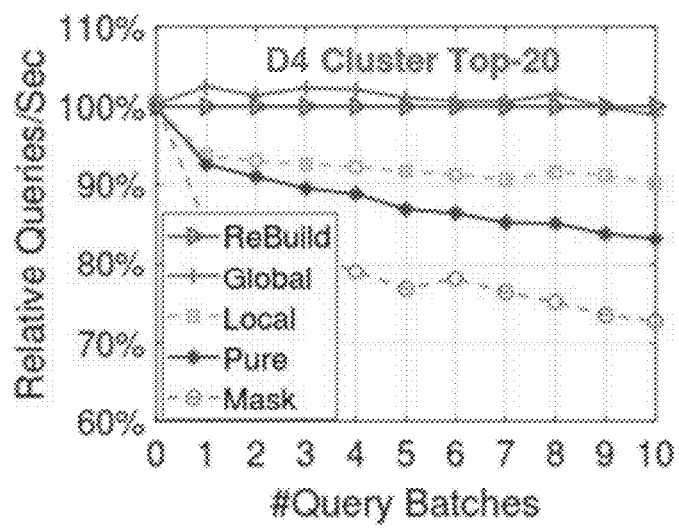
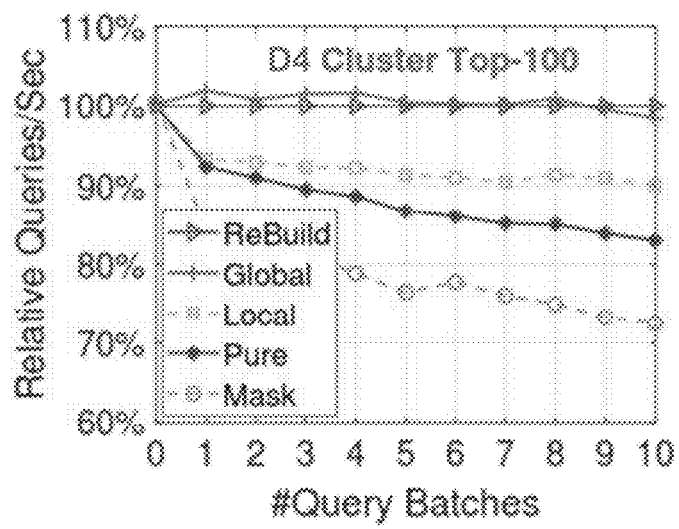
FIG. 4D

PROXIMITY GRAPH MAINTENANCE FOR FAST ONLINE NEAREST NEIGHBOR SEARCH

BACKGROUND

A. Technical Field

The present disclosure relates generally to systems and methods for computer learning that can provide improved computer performance, features, and uses. More particularly, the present disclosure relates to systems and methods for proximity graph maintenance for fast online nearest neighbor search.

B. Background

Approximate Nearest Neighbor (ANN) search is a fundamental technique for applications involving, e.g., the deployment of recommender systems. Recent studies bring proximity graph-based methods into practitioners' attention; proximity graph-based methods outperform other solutions such as quantization, hashing, and tree-based ANN algorithm families. In current recommendation systems, data point insertions, deletions, and queries are streamed into the system in an online fashion as users and items change dynamically. As proximity graphs are constructed incrementally by inserting data points as new vertices into the graph, online insertions and queries are well-supported in proximity graph methods. However, there exists no proper graph index updating mechanism for data point deletion, which involves removing a vertex from the proximity graph index.

Accordingly, what is needed are online ANN search methods using graph-based indexing that can imitate real-world settings, e.g., by incrementally performing insertion and deletion in given ANN search vector sets to dynamically handle changes in data distribution.

SUMMARY OF EMBODIMENTS

In one or more embodiments, a system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. In one or more embodiments, comprise a computer-implemented method for updating a graph. The computer-implemented method may comprise receiving a workload comprising one or more workload elements that each may comprise a data element and a type of operation that is a query, an insertion, or a deletion; in response to the type of operation being the deletion, performing steps may comprise: in a proximity graph, deleting a vertex that corresponds to one of the one or more workload elements; using at least one of a local or global reconnection method that reconstructs at least part of the proximity graph to update the proximity graph. The method may further comprise, in response to a vertex in the updated proximity graph being queried, executing a search that obtains a set of top-k data elements that correspond to neighbors of the queried vertex in the updated proximity graph; and outputting the set of top-k data elements. Other embodiments of this aspect may comprise corresponding computer systems, apparatus, and computer programs recorded on one or more computer storage devices, each configured to perform the actions of the methods.

Implementations may comprise one or more of the following features. The computer-implemented method may comprise, in response to the type of operation being the insertion, executing a search that, for each vertex to-be-inserted into the proximity graph, obtains a set of top-k candidate data elements. The computer-implemented method may further comprise, using the set of top-k candidate data elements to select a set of N nearest neighbors of the vertex, and adding edges to at least the proximity graph to update the proximity graph. The method may also comprise using the top candidate data element from the set of top-k data elements to perform a subsequent search. Further, the computer-implemented method may comprise using a reverse proximity graph to obtain incoming links on the proximity graph for the deleted vertex. Updating the proximity graph may comprise updating edges of vertices whose edges point to the deleted vertex. Deleting the one or more vertices may comprise at least one of a pure deletion method or a vertex masking method. Implementations of the described techniques may comprise hardware, a method or process, or computer software on a computer-accessible medium.

One or more embodiments may comprise a system for updating directed proximity graphs using a local reconnection method. The system may also comprise one or more processors; and a non-transitory computer-readable medium or media may comprise one or more sets of instructions which, when executed by at least one of the one or more processors, cause steps to be performed comprising: given a deleted vertex in a proximity graph, using a reverse proximity graph to obtain a first set of neighboring vertices that previously pointed to the deleted vertex; using the proximity graph to obtain a second set of neighboring vertices to which the deleted vertex previously pointed; for each of the second set of neighboring vertices, selecting among the first set of neighboring vertices a nearest neighbor; removing connections between the second set of neighboring vertices and the deleted vertex in the proximity graph; adding to the proximity graph edges that connect the nearest neighbors with each of the first set of neighboring vertices to update the proximity graph; and outputting the updated proximity graph. Other embodiments of this aspect may comprise corresponding computer systems, apparatus, and computer programs recorded on one or more computer storage devices, each configured to perform the actions of the methods.

Implementations may comprise one or more of the following features. The system may comprise adding edges to the reverse proximity graph to update the reverse proximity graph, and outputting the updated reverse proximity graph. The updated proximity graph may be used in a query that generates a set of top-k data elements corresponding to top-k neighbors of a queried vertex in the updated the proximity graph. The proximity graph may approximate a Delaunay Graph. The system may comprise using a reverse proximity graph to obtain incoming links on the proximity graph for the deleted vertex. The system may further comprise using a greedy search that may comprise maintaining a priority queue that may comprise at its top a vertex that maximizes a measurement function. Implementations of the described techniques may comprise hardware, a method or process, or computer software on a computer-accessible medium.

One or more embodiments may comprise a non-transitory computer-readable medium or media may comprise one or more sets of instructions which, when executed by at least one of the one or more processors, causes steps to be performed comprising: given a proximity graph, a reverse proximity graph, and a deleted vertex, using the reverse proximity graph to obtain first set of neighboring vertices that previously pointed to the deleted vertex; performing for each of the first set of neighboring vertices a search to find candidate vertices, selecting among the candidate vertices a subset of candidate vertices, removing previous links in both the proximity graph and the reverse proximity graph, using a global reconnection method to construct new links between the subset of candidate vertices and each of the first set of neighboring vertices to at least update the proximity graph, and outputting at least the updated proximity graph. Other embodiments of this aspect include corresponding computer systems, apparatus, and computer programs recorded on one or more computer storage devices, each configured to perform the actions of the methods.

Implementations may include one or more of the following features. The non-transitory computer-readable medium or media where updating the proximity graph may also comprise updating edges of neighboring vertices that point to a previous vertex in the proximity graph to obtain an updated proximity graph. The non-transitory computer-readable medium or media may comprise applying the search to the updated proximity graph to obtain nearest neighbors among the neighboring vertices. The non-transitory computer-readable medium or media may further comprise adding edges to the reverse proximity graph to update the reverse proximity and outputting the updated reverse proximity graph. The updated proximity graph may be used in a query that generates a set of top-k data elements corresponding to top-k nearest neighbors of a queried vertex in the updated the proximity graph. The search may be at least one of a beam search or a greedy search that may comprise maintaining a priority queue that may comprise at its top a vertex that maximizes a measurement function. Implementations of the described techniques may comprise hardware, a method or process, or computer software on a computer-accessible medium.

BRIEF DESCRIPTION OF THE DRAWINGS

References will be made to embodiments of the present disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 1A through FIG. 1E depict proximity graph deletion and graph updating methods, according to embodiments of the present disclosure.

FIG. 2A-FIG. 2D depict experimental data for relative queries per second to obtain 0.8 recall in each workload batch using a random update pattern, according to embodiments of the present disclosure.

FIG. 4A-FIG. 4D depict relative queries per second to obtain 0.8 recall in each workload batch using clustered update patterns, according to embodiments of the present disclosure.

DETAILED DESCRIPTION OF EMBODIMENTS

Figure 2C:
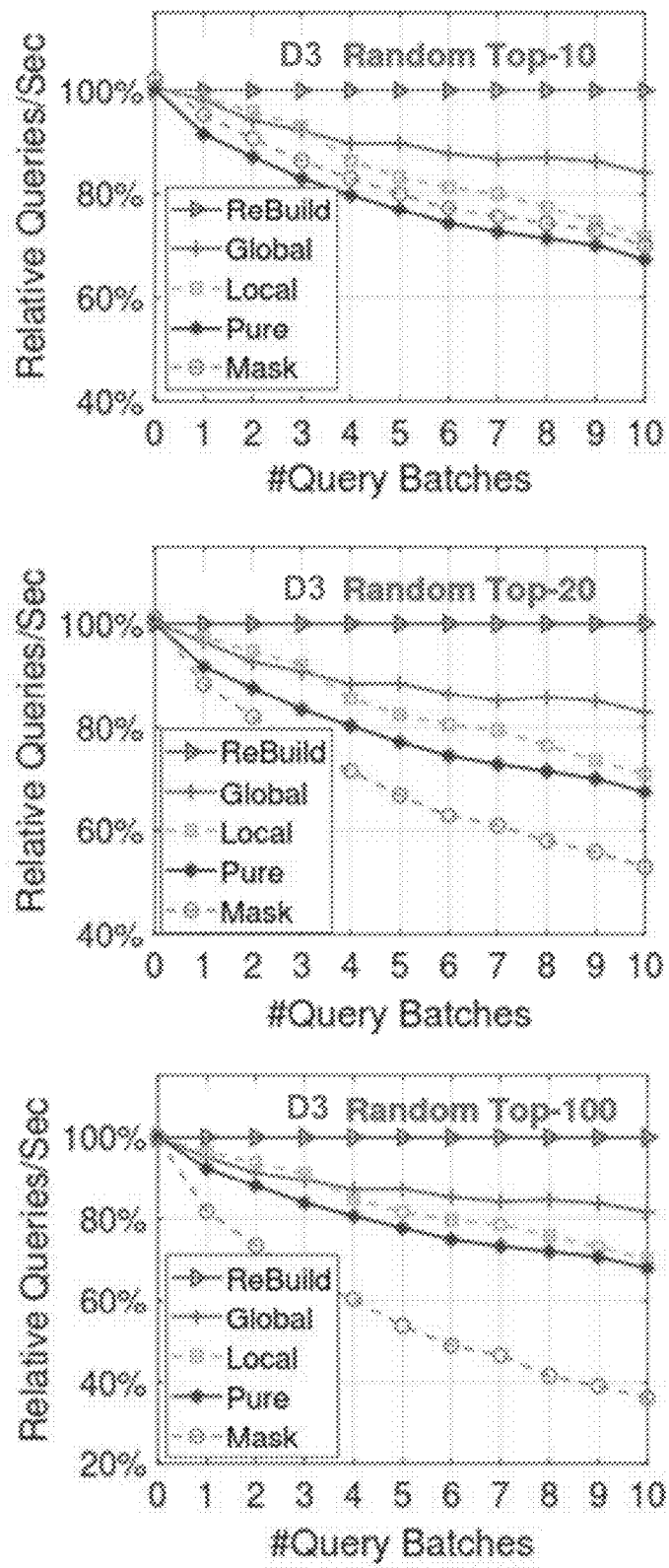
Figure 2D:
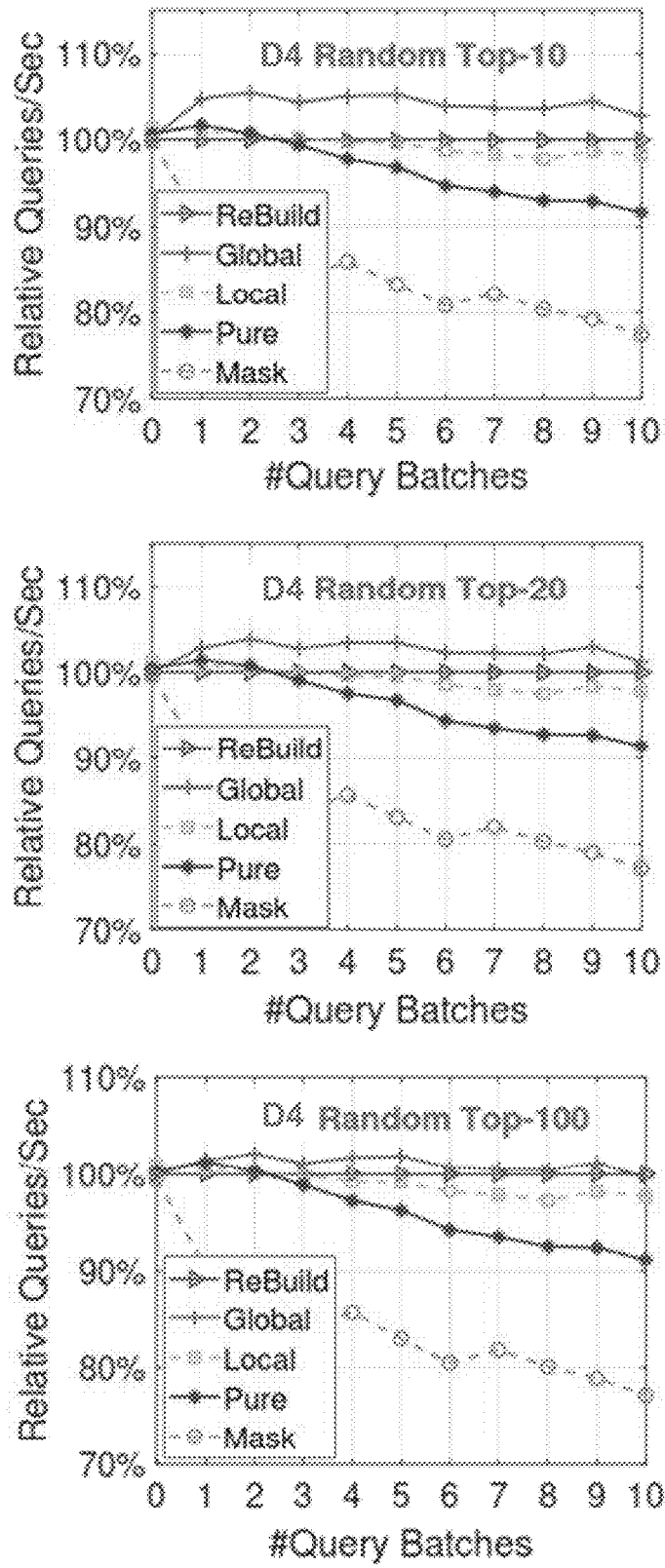

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification do not necessarily all refer to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists that follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded. In this document, "close" and "near" are used interchangeably.

One skilled in the art shall recognize that: (1) certain steps may optionally be performed; (2) steps may not be limited to the specific order set forth herein; (3) certain steps may be performed in different orders; and (4) certain steps may be done concurrently.

In one or more embodiments, a stop condition may include: (1) a set number of iterations that has been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of recommender systems, aspects of the present disclosure are not so limited. Accordingly, aspects of the present disclosure may be applied or adapted for use in other contexts, such as search engines and other applications.

ANN search is a fundamental technique widely used in applications such as recommendation systems and search engines. Given a query vector q and a dataset $\mathcal{D}$, the goal of an ANN search is to find a vector $p \in \mathcal{D}$ that minimizes metric distance $f(p,q)$ with sub-linear time complexity, where $f$ represents a distance measure, e.g., Euclidean distance. Existing ANN search algorithms such as tree methods, hashing methods, and quantization methods, are based on the idea of space partition. Recently, graph-based approaches have demonstrated promising empirical performance in ANN search. The general paradigm of these methods can be summarized as two steps: First, a dataset is indexed as a proximity graph G, where every vertex represents a data vector and every edge connects two "close" vertices. Then, walking on G towards the query q, nearest neighbors are obtained by maintaining a priority queue that stores the searching vertex candidates. In each search step, the vertex that is closest to q is extracted from the priority queue, and all unvisited neighbors of the vertex are pushed into the priority queue for future search steps. Proximity graph indexing is constructed in a bootstrap manner. Data vectors are incrementally inserted as new vertices. Each time a new vertex is inserted, the existing graph index is queried to obtain the nearest neighbors of the vertex from the priority queue, and edges are created between them.

However, graph-based methods do not support ANN search in online settings due to the lack of a vertices update mechanism. In real-world applications, online ANN search means that a dataset, D, is updated by deletion and insertion for a period of time. For instance, in sponsored search systems for online advertising, the deep Click-Through Rate (CTR) prediction models learn user vectors and ad vectors and measure these by cosine distance to predict a final CTR. Given a user vector, ANN search is applied to retrieve ad vectors that minimize their cosine similarity. Due to the dynamic changes of sponsored items over time, the online Ad systems will update the ad vectors by deleting the expired ads and inserting recently arrived Ads. In these settings, although the incremental vertex insertion construction algorithm of a graph-based algorithm can handle the upcoming Ad vectors, there is no specialized design for removing expired vertices on the graph. If the vertices of expired Ads are preserved on the graph, both search precision and efficiency tend to decline, mainly due to the time wasted in visiting and ranking useless vertices. Conversely, if vertices as well as their edges are removed, the connectivity of the graph will be broken, which will also cause inefficiency in the search phase. Therefore, when graph-based ANN search methods are deployed in online systems, a periodical reconstruction of the indexing graph is inevitable. Yet, re-indexing the large-scale datasets scales as $\mathcal{O}(n \log(n))$ increases computation and memory cost for online services.

Various embodiments herein present an incremental proximity graph maintenance (IPGM) process for online ANN search that supports both online vertex deletion and insertion of vertices on proximity graphs. Given a vertex deletion request, embodiments herein incrementally update the connections of the vertex using updating schemes that enable indices to update even when the data distribution is evolving over time, advantageously, without suffering the performance drop of existing systems. Therefore, the systems and methods presented herein are well-suited for deployment in practical applications.

In this patent document, the proximity graph maintenance problem is formally defined and theoretical proof of the feasibility of incremental updates on proximity graphs is provided. Presented are embodiments of an online graph maintenance framework and various novel proximity graph update strategies that allow for maintaining proximity graph properties when deleting vertices. Massive experimental evaluations on datasets confirm effectiveness. For example, one global reconnection embodiment outperforms a reconstruction baseline in query processing speed by up to 18.8%.

A. General Background Information

1. Related Work a. Graph-Based ANN Search

In traditional settings, graph-based ANN search methods index a dataset as a similarity graph on which each node represents a data vector in the dataset, and the edge between two nodes indicates their potential as neighbors. In a search phase, these methods traverse a query vector by following paths on the graph in a greedy manner. All visited vertices are compared with the query vector using a metric similarity measure (e.g., Euclidean distance or cosine distance) or a non-metric similarity measure (e.g., inner product or a neural network-based measure). Graph-based ANN search methods are related in spirit to the idea of six degrees of separation, which states that every two people on earth are related by at most six social connections (e.g., parents, friends, etc.). Therefore, graph-based methods significantly reduce the empirical time for ANN search. There exist theoretical insights that explain this phenomenon.

Most ANN search scenarios in the literature are static in nature. In the Experimental Results (Sec. B) below, graph-based methods are compared with other ANN search methods on a fixed dataset such as the first or second dataset. However, in current ANN applications, such as feed-in ad recommender systems, the distribution of a dataset (e.g., product vectors) changes over time due to activation and expiration of products. Therefore, modification to graph-based methods for online applications is essential for filling their gap with practical usage. However, as the insertion or deletion of vertices on a graph breaks the graph's topology, direct modification of graph-based methods for online applications remains challenging, especially, due to the unaffordability of the resulting computational cost.

b. Online ANN Search

Besides graph-based ANN methods, some ANN methodologies can be modified for online settings, such as hashing and quantization methods. However, such approaches have shortcomings that lie mainly in their lower speeds during the search phase.

Some hashing methods modify supervised hashing algorithms to accommodate sequential inputs. These online hashing models achieve promising results in handling sequential input vectors. However, in real-world systems, online hashing requires expensive and infeasible labeling for each data vector. In addition, online learning paradigms do not support the removal of expired data vectors. Random projection-based locality sensitive hashing (LSH) methods achieve sub-linear memory ANN search on streaming data by compressing data as binary sketches and storing them in an Array-of-Counts hash table. This way, indexing of streaming data is transformed into the refreshment in hash tables, which enables online insertion and deletion. However, the ANN search speed of randomized LSH methods in dense data vectors is largely outperformed by graph-based methods, which limits the usefulness of LSH's applications.

For existing quantization methods, the main challenges involve updating the codebook according to the changes of the data distribution in the database. Quantization based ANN search methods partition the original space into Cartesian products or weighted sum of subspaces and then quantize every subspace as a codebook. Usually, the quantization step is realized via k-means clustering, and the codebook stores the vectors of k centroids. Then, each vector in the database is represented by IDs of centroids in the codebook. In the search phase, one only needs to compute the distances between query vectors and centroids in the codebook for ranking. In this way, quantization methods can perform an efficient ANN search, especially in multi-thread settings. However, in online settings, the changes in the distribution in the database require expensive re-computations of codebook and codewords. To tackle this issue, some have proposed a PQ approach that supports data insertion and deletion by updating the codebook without changing the codewords of existing vectors in the database. This online PQ method achieves promising results in sliding window settings.

2. Problem Statement

Formally, the ANN search problem is defined as follows:
Problem 1 (ANN Search): Given a dataset D and a query vector q in Euclidean space $\mathbb{R}^d$, efficiently compute $$p = \operatorname*{argmax}_{x \in D} f(x, q). \quad \text{Eq. (1)}$$

Metric similarity such as $f(x,q) = -\|x-q\|$ minimizes the Euclidean distance, and $$f(x, q) = \frac{x^T q}{\|x\|\|q\|}$$

maximizes the cosine similarity. In most real-world datasets, a linear scan is infeasible to solve this problem because $|D| \gg d$. To remedy this issue, D is indexed as a proximity graph G=(D,E), where each vertex represents a $x_i \in D$ and each pair $(x_i, x_j)$ indicates the connection between vertices. Given each q, the solution of Equation 1 may be found by walking on G. As a walking path only covers a fraction of vertices on G, the speed for solving Equation 1 is accelerated at the expense of precision.

For metric similarities that satisfy triangle inequality, an efficient proximity graph G usually approximates a Delaunay graph, which is defined by Voronoi cells.

Definition 1: For fixed $x_i \in D \subset \mathbb{R}^d$ and a given function $f$, Voronoi cells $R_i$ are defined as $$R_i := R_i(f,D) := \{q \in \mathbb{R}^d | \forall x \in D, f(x_i,q) \geq f(x,q)\}.$$

Voronoi cells determine the solution of Equation 1. Note that $x_j \in \operatorname{argmax}_{x_i \in D} f(x_i, q)$ if and only if $q \in R_j$. The Delaunay graph is the dual diagram of Voronoi cells, which is given by the following definition:

Definition 2: For a fixed function $f$ and dataset $D \subset \mathbb{R}^d$, given Voronoi cells $R_i$, $i=1, 2, \ldots, n$ with respect to $f$ and D, the Delaunay graph of D is an undirected graph G with vertices $\{x_i \in D\}$, and the edge $\{x_i, x_j\}$ exists if $R_i \cap R_j \neq \emptyset$.

For the graph-based ANN search problem, the guarantee of finding the optimal solution for Equation 1 on a Delaunay graph is given in Theorem 1: For a given metric similarity $f$, assume, for any dataset D, each Voronoi cell $R_i$ is connected. Let G=(D,E) be the Delaunay graph with respect to the Voronoi cells. Then for any $q \in \mathbb{R}^d$, greedy search on the Delaunay graph returns the solution of Equation 1. In other words, let $N(x_i) = \{x_j \in D: \{x_i, x_j\} \in E\}$ be the neighbors of $x_i$ on G. If $x_i$ satisfies $$f(x_i, q) \geq \max_{x_j \in N(x_i)} f(x_j, q), \quad \text{Eq. (2)}$$

then $x_i$ is a solution of Equation 1.

For a large-scale dataset, the computation cost of constructing and storing both Voronoi cells and the Delaunay graph is unaffordable. The performance of proximity graphs in the ANN search depends on their approximation to the Delaunay graph.

Regarding the maintenance of G in online settings, the ANN search problem becomes:

Problem 2 (Online ANN Search): Given a dataset sequence $\{D_1, D_2, \ldots D_T | D_i \cap D_{i+1} \neq \emptyset, i=1, 2, \ldots, T\}$ and a query vector q in Euclidean space $\mathbb{R}^d$, efficiently compute:

$$p = \underset{x \in D_i}{\mathrm{argmax}} f(x, q) \quad i \in \{1, 2, \ldots, T\} \qquad \text{Eq. (3)}$$

Here, $D_i \cap D_{i+1} \neq \emptyset$ indicates the possibility of data insertion and deletion in each step. Starting from proximity graph $G_1$ that approximates the Delaunay graph, $D_1$, the goal is to develop a proximity graph maintenance algorithm to update (G,D) such that $G_{i+1} = \mathrm{update}(G_i, D_{i+1})$ i $\in \{1, 2, \ldots, T\}$ is an approximation of the Delaunay graph with respect to $D_{i+1}$.

3. Incremental Proximity Graph

Theoretical proof that deletion of a vertex on a Delaunay graph requires only an update of the removed vertex's neighbors' connections is provided next. Based on this insight, in one or more embodiments, a high-level incremental proximity graph maintenance framework is provided for online update settings.

a. Theoretical Analysis

This section proves that the only requirement to update the edges of a deleted vertex's neighbors is to maintain the properties of Delaunay graph—the incremental graph maintenance is feasible in online settings. Given the Delaunay graph G of vertices S, assuming that vertex $x_0$ is removed from S, and:

(1) assuming $x \in D$ is not a neighbor of $x_0$ in G, then the neighbors of x in the new Delaunay graph (corresponding to $S \setminus \{x_0\}$) remain the same as the ones in the old G.

(2) assuming $x \in D$ is a neighbor of $x_0$ in G, then its incident edges except $\{x, x_0\}$ remain existing in the Delaunay graph.

These properties are rigorously stated in Theorem 2. Given a graph G that is a Delaunay graph or contains Delaunay graph as subgraph, it can be demonstrated that:

(1) if a vertex $x_i$ is removed from G, G still contains a Delaunay graph if the connections of $N(x_i)$ are updated.

(2) if a vertex $x_i$ is inserted to G, G still contains a Delaunay graph if $N(x_i)$ is set up.

Theorem 2: Let $f$ be a continuous function such that for any dataset every Voronoi cell is nonempty and connected. Let G and G' be the Delaunay graphs corresponding to respective data points $D = \{x_0, \ldots, x_n\}$ and $D' = \{x_1, \ldots, x_n\} = D \setminus \{x_0\}$. Let $N(x_i, G)$ and $N(x_i, G')$ be the set of neighbors of $x_i$ on graph G and G', respectively, then (a) for all $x_i \notin N(x_0, G)$, $N(x_i, G) = N(x_i, G')$, and (b) after removing $x_0$ and its incident edges from G, the resulting graph is a subgraph of G'.

Proof (a) Part 1: $N(x_i, G) \subseteq N(x_i, G')$.

By the definition of Voronoi cells, since $D' \subset D$, for all $x \in D'$, $$R_x(D) = \cap_{y \in D} \{q \in Y: f(x,q) \geq f(y,q)\} = R_x(D') \cap \{q \in Y: f(x, q) \geq f(x_0, q)\}.$$

Hence, $R_x(D) \subseteq R_x(D')$. As a result, $R_x(D) \cap R_y(D) \neq \emptyset$ implies $R_x(D') \cap R_y(D') \neq \emptyset$. Thus, $N(x_i, G) \subseteq N(x_i, G')$.

Part 2: $N(x_i, G') \subseteq N(x_i, G)$.

Assuming $y \in N(x_i, G')$ but $y \notin N(x_i, G)$, then, by definition of the Delaunay graph, $$R_y(D') \cap R_{x_i}(D') \neq \emptyset \text{ and } R_y(D) \cap R_{x_i}(D) = \emptyset.$$

Since $$R_y(D) \cap R_{x_i}(D) = R_y(D') \cap R_{x_i}(D') \cap \{q \in Y: f(y,q) \geq f(x_0,q)\} \cap \{q \in Y: f(x_i,q) \geq f(x_0,q)\} = \emptyset$$

this yields:

$$R_y(D') \cap R_{x_i}(D') \subseteq \{\{q \in Y: f(y,q) < f(x_0,q)\} \cup \{q \in Y: f(x_i,q) < f(x_0,q)\}\}$$

Hence, $R_y(D') \cap R_{x_i}(D') \subseteq R_{x_0}(D)$. Selecting $q \in R_{x_i}(D)$ and $q' \in R_y(D') \cap R_{x_i}(D')$, since $R_{x_i}(D')$ is connected, there exists a path $c: [0,1] \to R_{x_i}(D')$ that connects q and q'. Considering the function:

$$g(t) = f(x_0, c(t)) - f(x_i, c(t))$$

one has:

$$g(0) = f(x_0, q) - f(x_i, q) \leq 0 \text{ and } g(1) = f(x_0, q') - f(x_i, q') \geq 0.$$

By continuity of $f$ and the intermediate value theorem, there exists a $t^* \in [0,1]$ such that $g(t^*) = 0$. Hence, $R_{x_i}(D)$ and $R_{x_0}(D)$ intersect at $c(t^*)$, which contradicts $x_i \notin N(x_0, G)$.

(b) assuming $x, y \in D$ and the edge $\{x, y\} \in G$, then $R_x(D) \cap R_y(D) \neq \emptyset$. Hence, $R_x(D) \cap R_y(D) \subseteq R_x(D') \cap R_y(D') \neq \emptyset$. Therefore, $\{x, y\} \in G'$.

This demonstrates that a greedy search on a proximity graph is guaranteed to find the exact nearest neighbor for every given query. However, it is computationally infeasible to build an exact Delaunay Graph in high-dimensional data because the number of edges grows exponentially as the size of the dataset increases. One solution is to approximate a Delaunay Graph and trade accuracy for significant efficiency improvements. Practical applications employ the proximity graph as an approximation of the Delaunay graph. Therefore, embodiments herein focus on incremental maintenance on proximity graphs.

b. High-Level Proximity Graph Maintenance Embodiments

An exemplary high-level IPGM process embodiment, Method 1, is introduced next.

Method 1—Graph-Maintenance(W,k,d,$f$)

1: Input: workload $W = \{(o_1, x_1), \ldots, (o_n, x_n)\}$, the size of priority queue k, maximum outgoing degree of graph d, measurement function $f$
2: $Y \leftarrow \{ \}$.
3: for i=1 to n do
4: if $o_i$=query then
5: $C_i \leftarrow$ GREEDY-SEARCH($x_i$,G,k,$f$,Y).
6: else if $o_i$=Insert then
7: C$\leftarrow$GREEDY-SEARCH($x_i$,G,k,$f$,Y).
8: N$\leftarrow$SELECT-NEIGHBORS($x_i$,C,d,$\emptyset$).
9: for $z \in$ N do
10: Add edges ($x_i$,z) to G and (z,$x_i$) to G'.
11: end for
12: else if $o_i$=delete then
13: if $x_i \in$ G then
14: DELETE-UPDATE-EDGES
15: end if
16: end if
17: end for
18: Output: top-K objects $C_i \subseteq D$ in descending order of $f$ with $x_i$ for every $\{(o_i, x_i) \in W | o_i=\text{query}\}$.

In one or more embodiments, in each state of a workload, a Delaunay Graph may be approximated via a directed proximity graph, where each vertex may have edges that are pointed to the neighbors (i.e., out-neighbors) of the vertex. $W = \{(o_1, x_1), (o_2, x_2), \ldots, (o_n, x_n)\}$ may be used to represent the online ANN search workload. For each $(o_i, x_i)$ ∈W, $o_i$ may represent a type of operation, e.g., a query, an insertion, or a deletion, and $x_i$ may be corresponding vectors. It is noted that type of operation-data element pairs $(o_i,x_i)$ in workload W may be random or ordered in any arbitrary manner, e.g., by type.

Query. In one or more embodiments, a querying operation may be performed by executing a search, e.g., a greedy search on the proximity graph G. An exemplary process embodiment for a greedy search is presented in Method 2. Given a query vector q and a graph G, a suitable method may first randomly choose a vertex $x_s$ on G. Starting at $x_s$, q may walk on G. During the walk, a priority queue may be preserved wherein the vertex that maximizes the measurement function $f$ is on top of the queue. For every visited vertex x, its out-neighbors may be placed into the queue according to priority, e.g., after calculating their similarity with the query vector q.

Insertion. In one or more embodiments, when the type of the operation $o_i$ is an insertion, a greedy search may be performed on G to obtain $x_i$'s top-K neighbors (e.g., as in a query phase). Then, the vertex may be extracted from the queue as a starting point for a subsequent search step. Once walking is halted, the top-K vertices in the queue may be selected and returned. In one or more embodiments, the top-K neighbors of $x_i$ found on G may be selected and connections may be set in G and G', e.g., by adding edges between $x_i$ and its top-K neighbors. Method 3 below illustrates an exemplary edge selection process embodiment. After the selection, $x_i$'s outgoing vertices may be nearest neighbors in various directions.

Method 2—Greedy-Search(q, G, k, $f$, Y)

1: Input: query element q, graph G=(D,E), number of candidates to return k, measurement function $f$, deleted vertices Y.
2: Initialize the priority queue by random sampling, C←{$x_i | x_i \in G, x_i \notin Y$}.
3: Mark $x_i$ as checked and the rest of vertices as unchecked.
4: if |C|>k then
5: C top-k elements of x∈C in descending order of $f(x,q)$.
6: end if
7: while ∃x∈D unchecked and C do
8: C←C∪{y∈D: x∈C, y unchecked, (x,y)∈E, y∈Y}
9: Mark elements in C as checked.
10: if |C|>k then
11: C top-k candidates of x∈C in descending order of $f(x,q)$.
12: end if
13: end while
14: Output: C.

Deletion. In one or more embodiments, when the type of the operation $o_i$ is a deletion and $x_i \in G$, a vertex deletion and graph update process may commence. In one or more embodiments, for each expired vertex $x_i$, its incoming vertices on G may first be obtained using reverse graph G'. Letting N'($x_i$) be the in-neighbors of vertex $x_i$, i.e., the vertices that point to $x_i$ in G, one or more DELETE-UPDATE-EDGES embodiments discussed in Sec. 4, below, may be used to update the edges of N'($x_i$) such as to maintain the proximity graph—the nearest neighbors may be retrieved from the updated graph, e.g., by using a greedy searching method. In addition, reverse graph G' may be updated according to G.

It is noted that a sub-optimal updating method may reduce the connectivity of a proximity graph such that a greedy search may not be able to accurately locate nearest neighbors. In online settings, a deletion operation is called regularly in the workload, thus, the magnifying the disadvantages of sub-optimal updating methods. Therefore, it is desirable to have updating systems and methods that allow for updating graph G without suffering reduced connectivity, search precision, or efficiency.

Method 3—Select-Neighbors(x, C, d, I)

1: Input: element x, the set of k-nearest neighbors C of x, maximum outdegree d, invalid candidate set I.
2: Initialize the out-neighbors set N of x, i.e., N←∅.
3: Order $y_i \in C$ in ascending order of $\|x-y_i\|$.
4: i←1.
5: while |N|≤d and i≤|C| do
6: if $\|x-y_i\| \leq \min_{z \in N}\|z-y_i\|$ and $y_i \notin I$ then
7: N←N∪{$y_i$}.
8: end if
9: i←i+1.
10: end while
11: Output: a set of elements N.

4. Delete-Update-Edges Embodiments

FIG. 1A through FIG. 1E illustrate graph updating methods according to embodiments of the present disclosure.

a. Pure Delete Embodiments

In one or more embodiments, delete operations for a proximity graph update involve removing a vertex as well as its connections. Method 4 and FIG. 1B demonstrate a pure deletion process according to embodiments of the present disclosure. Given a deleted vertex $x_i$, first out-neighbors and in-neighbors may be obtained. For each out-neighbor $x_j$, edge ($x_i,x_j$) on the proximity graph G and ($x_j,x_i$) on the reverse proximity graph G' may be removed. Conversely, for each in-neighbor $x_k$, edge ($x_k,x_i$) on the proximity graph G and ($x_i,x_k$) on the reverse proximity graph G' may be removed.

Method 4—Pure-Delete($x_i$,G,G',$f$,d)

1: Input: deleted vertex $x_i$, proximity graph G and its reverse graph G', measurement function $f$, maximum outgoing degree of graph d.
2: N'($x_i$)←out-neighbors of $x_i$ in G'.
3: N($x_i$)←out-neighbors of $x_i$ in G.
4: for $x_j$ in N($x_i$) do
5: Remove ($x_i,x_j$) in G and ($x_j,x_i$) in G'
6: end for
7: for $x_k$ in N'($x_i$) do
8: Remove ($x_k,x_i$) in G and ($x_i,x_k$) in G'
9: end for
10: Output: G, G'.

b. Vertex Masking Embodiments

It is noted that a pure deletion process may break the connectivity of the proximity graph, which may cause a greedy search to fail since the paths towards the exact nearest neighbors may be blocked. Therefore, to preserve connectivity, in one or more embodiments, the deleted vertices may be masked as "deleted" and placed into Y in Method 1. When performing a greedy search, the masked vertices may still be visited. However, the "deleted" vertices are not placed into the result priority queue. As a result, the visited deleted vertices are not counted as top-k candidates. The connections of the vertices in the graph may remain unchanged. One advantage of such masking methods is that the connectivity of the original proximity graph is preserved and the expired vertices are still useful for guiding the greedy search.

It is noted that after masking, the search space for each query may be unnecessarily large, and visiting expired vertices may slow down the greedy search speed. In addition, since all expired vertices are still stored, space grows continuously as the stream performs, which may cause memory issues.

c. Local Reconnect Embodiments

To improve connectivity of the proximity graph and reduce possible useless visits in the search phase, in one or more embodiments, local connections between the in-neighbors and out-neighbors of the deleted vertex may be reset. Method 5 and FIG. 1D illustrate a local reconnect process according to embodiments of the present disclosure. For each expired vertex $x_i$, in-neighbors $N'(x_1)$ may first be acquired from G', and out-neighbors $N(x_i)$ may be acquired from G. In one or more embodiments, for each in-neighbor $x_j$, the edge from $x_j$ to $x_i$ may be removed in G and G'. Then, the most diverse vertex z for $x_j$ may be selected from $N(x_i)$, and out-going links may be set from $x_j$ to z.

In this manner local reconnect methods may compensate an edge for the in-neighbors of a deleted vertex. According to the nearest neighbor expansion, the out-neighbors of expired vertex $x_i$ may be the neighbors of $x_j \in N'(x_i)$. Since the proximity graph is an approximation of a real Delaunay Graph, out-neighbors of $x_i$ may not be $x_i$'s exact nearest neighbors.

Method 5—Local-Reconnect($x_i$,G,G',$f$,d)

1: Input: deleted vertex $x_i$, proximity graph G and its reverse graph G', measurement function $f$, maximum outgoing degree of graph d.
2: $N'(x_i) \leftarrow$ out-neighbors of $x_i$ in G'.
3: $N(x_i) \leftarrow$ out-neighbors of $x_i$ in G.
4: for $x_i$ in $N'(x_i)$ do
5: $N(x_j) \leftarrow$ out-neighbors of $x_j$ in G.
6: z←SELECT-NEIGHBORS($x_j$, $N(x_i)$, 1, $N(x_j) \cup \{x_j\}$).
7: Remove ($x_j$,$x_i$) in G and ($x_i$,$x_j$) in G'.
8: if z!=null then
9: Add edges ($x_j$,z) to G and (z,$x_j$) to G'.
10: end if
11: end for
12: Output: G, G'.

d. Global Reconnect Embodiments

In one or more embodiments, to compensate for in-neighbors of deleted vertices with better edges, a global reconnection method for proximity graph update may be used. Method 6 and FIG. 1E illustrate a global reconnect process according to embodiments of the present disclosure. For each expired vertex $x_i$, in-neighbors $N'(x_i)$ may be acquired from G' and out-neighbors $N(x_i)$ may be acquired from G. Then, for every element $x_j$ in $N'(x_i)$, a greedy search may be performed to obtain the nearest neighbors C of $x_j$ on graph G. In one or more embodiments, a SELECT-NEIGHBORS method such as exemplary Method 3 may be used to select the vertices set N from Z to fit the regulation for graph degree d. Finally, previous connections of $x_j$ may be removed and edges may be reset by vertices in N.

In one or more embodiments, the deletion method may treat each in-neighbor $x_j$ of the expired vertex as a new vertex and reset $x_j$'s connections by re-inserting it on the proximity graph. In this way, $x_j$ has an opportunity to improve its connection by re-selecting vertices globally. Therefore, the proximity graph may better approximate a Delaunay Graph. In one or more embodiments, the time cost associated with updating may be amortized by the number of query operations. In real-world recommendation systems or search engine applications, the number of queries (users) may be much larger than the number of data (e.g., Ads, items), and one query may occur at a high frequency. As a result, such deletion methods may outperform existing online graph-based ANN search approaches.

Method 6—Global-Reconnect($x_i$,G,G',k,$f$,d)

1: Input: deleted vertex $x_i$, proximity graph G and its reverse graph G', the size of priority queue k, measurement function $f$, maximum outgoing degree of graph d.
2: $N'(x_1) \leftarrow$ out-neighbors of $x_i$ in G'.
3: for $x_j$ in $N'(x_i)$ do
4: C←GREEDY-SEARCH($x_j$,G,k,$f$).
5: N←SELECT-NEIGHBORS($x_j$,C,d,$\{x_i\}$).
6: Remove $N(x_j)$ in G and $N'(x_j)$ in G'
7: for z∈N do
8: Add edges ($x_j$,z) to G and (z,$x_j$) to G'.
9: end for
10: end for
11: Output: G, G'.

B. Experimental Results

It shall be noted that experiments and results herein are provided by way of illustration and were performed under specific conditions using a specific embodiment or embodiments; accordingly, neither these experiments nor their results shall be used to limit the scope of the disclosure of the current patent document. Experimental evaluation herein investigates the performance of update methods according to embodiments of the present disclosure on real datasets. Performance comprises both the quality and efficiency of retrieving top-k candidates and execution time for indexing and searching.

Experimental evaluation of one or more embodiments attempts to answer questions such as: Do embodiments of the global reconnect method improve a performance of the proximity graph? How does this method compare to other graph update methods? Is the global reconnect method robust for different update patterns? How do the method and the baselines perform in different update patterns? Does the global reconnect method reduce the total execution time for insertion, deletion, and query?

Implementation. Update methods are implemented as a C++11 prototype. The code is compiled with g++-5.4.0. "O3" optimization on the code is enabled. Hierarchical Navigable Small World is employed as the proximity graph searching method. The code comprises special functions to harness detailed profiling data.

Hardware System. Experiments are executed on a single node server having one Intel® Core™ i7-5960X central processing unit (CPU) @3.00 GHz (64 bit)—8 cores 16 threads—with 32 GB memory. The operating system is Ubuntu 16.04.4 64-bit.

Retrieval Quality. Recall is a widely-used quality measurement for ANN problems. Suppose the candidate set returned by a method is A, and the correct K nearest neighbor set of the query is B, then the recall is defined as $$\text{Recall}(A) = \frac{|A \cap B|}{|B|}.$$

Higher recall corresponds to better approximation to the exact nearest neighbors.

Data. Four real ANN benchmark datasets are used for experiments. The dimension of vectors in these datasets are 128, 200, 256, and 960. The third dataset contains 280,000 vectors while others contain 1,000,000 vectors. The distribution of the datasets also diverges—the second and third datasets are heavily skewed, while the first and fourth datasets have less skewness.

Workload. For each of the four ANN datasets, 10 step workloads are built. Given the base set, each step of the workload removes a set with 10,000 vectors and then digests a set with 10,000 vectors. After that, a query set of 10,000 vectors are fed for a top-K ANN search. In this case, the size for the base set in the third dataset is 180,000 while other sets are 900,000.

Two update patterns are considered in the experiments: (a) Random updates: the whole data set is permuted before partition. Each vector of a base, delete, insert, and query set is randomly selected from the original dataset. (b) Cluster updates: 10 class K-means clustering is performed on the whole dataset. Then, the clusters are placed in a sequence, and base, delete, and insert sets are built in the order of this sequence. Therefore, at each step, several clusters of vectors on the graph are removed. Then, several clusters are inserted.

Methods. The abbreviations for the methods discussed herein are: PURE, MASK, LOCAL, and GLOBAL. Methods also include ReBuild, which reconstructs the whole graph in each update batch before query.

1. Query Time

In this section, query efficiencies for various methods and for a baseline are presented. FIG. 2A-FIG. 2D depict relative queries per second to obtain 0.8 recall in each batch. The update pattern for each batch comprises random updates. Relative queries processed per second (QPS) are plotted against the query batches of workloads from four benchmark ANN datasets, which are labeled D1-D4 in FIG. 2A-FIG. 2D and FIG. 4A-FIG. 4D. The QPS versus the query batches of workloads of the fourth dataset is presented in FIG. 2A-FIG. 2D and FIG. 4A-FIG. 4D. In each workload, the pattern described above is followed. Here, the relative QPS is the result of real QPS divided by the QPS of ReBuild method in 0.8 Top-10, Top-20, or Top-100 recall.

a. Random Updates

Experimental results in FIG. 2A-FIG. 2D demonstrate that global reconnect achieves superior performance over other delete-update-edge methods. For each dataset, the QPS of different methods start at the same point in query batch 0, which means that they have the same performance when performing ANN search on the base set without an update. Then, as the batch increases, it can be observed that the global reconnect method has higher QPS than other incremental update methods. In the first dataset, the global reconnect method even outperforms the reconstruct graph in QPS at 0.8 Top-10 recall. The same phenomenon also occurs in the second and fourth datasets. For baseline methods, the local reconnect method achieves the best performance. The Pure deletion method has a QPS drop as the batch increases, which means the proximity graph becomes more inefficient due to the broken connectivity. The vertex mask method achieves the lowest QPS in each batch, illustrating that unnecessary visits of expired vertices can significantly influence the performance of ANN search on the proximity graph.

b. Clustered Updates

FIG. 4A-FIG. 4D depict relative queries per second to obtain 0.8 recall in each batch. The update pattern for each batch is clustered updates. The results in FIG. 4A-FIG. 4D demonstrate a superior performance of the global reconnect method in workloads with clustered updates. Similar to FIG. 2A-FIG. 2D, global reconnect achieves the best QPS in each batch at 0.8 Top-10, Top-20, or Top-100 recall. In the clustered updates settings, some vectors and their nearest neighbors are deleted in each update step. Therefore, for vectors located near to these clusters, a large fraction of their nearest neighbors are also deleted. To update their connections, global search on graph is performed to find new nearest neighbors.

Different from random updates, in clustered updates, it is observed that the global reconnect method outperforms graph reconstruction in almost all scenarios. Since the graph is constructed incrementally—new edges of an inserted vertex are connected based on the existing vertices—those edges do not accurately reveal the exact nearest neighbors. The global reconnect method updates edges based on the entire graph. The edges in the graph are refined during the updates; thus, a better performance than the reconstruction baseline is observed.

2. Overall Execution Time

Figure 3:
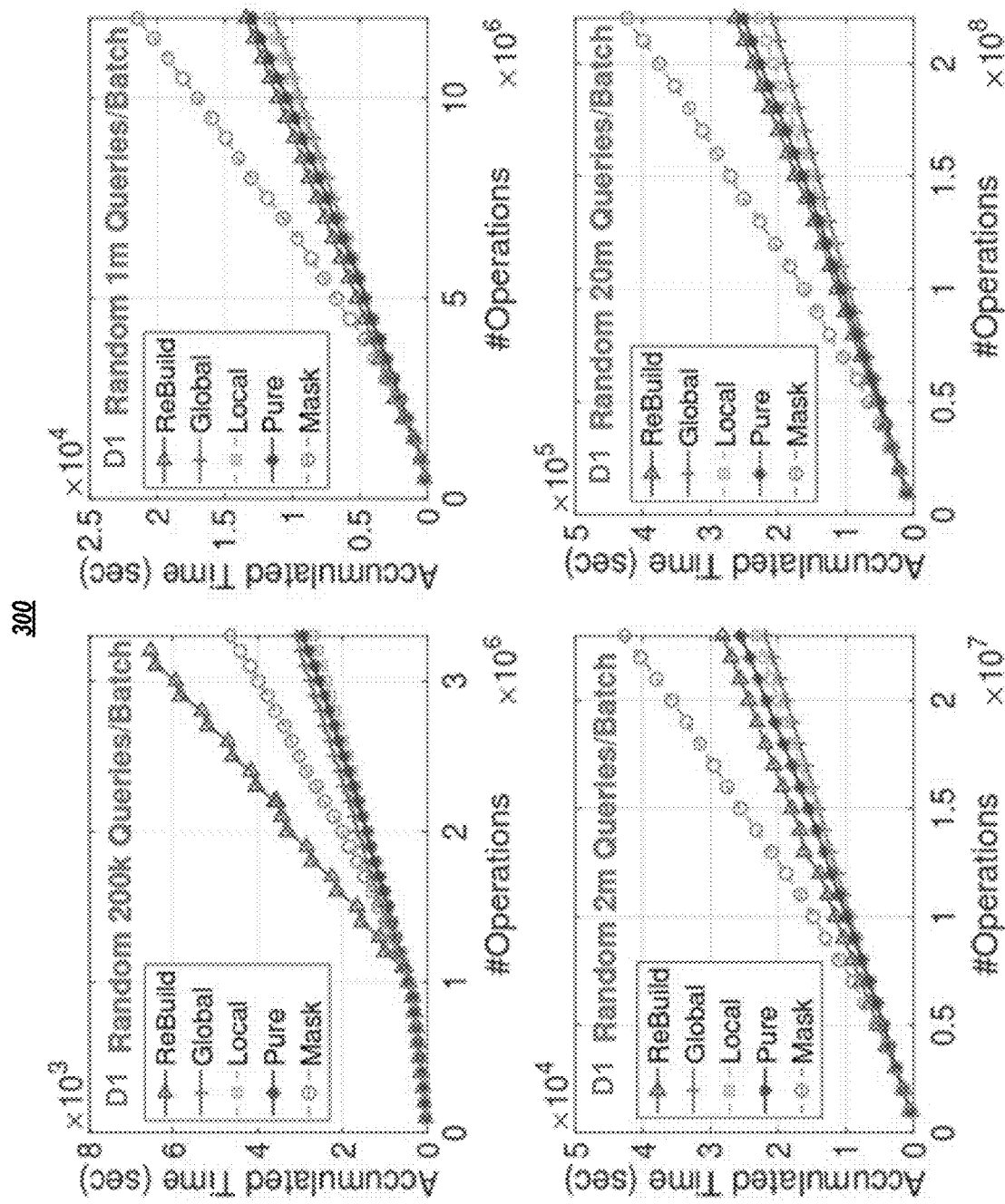
FIG. 3 depicts experimental data for exemplary total execution times versus number of operations, according to embodiments of the present disclosure.
Figure 4A:
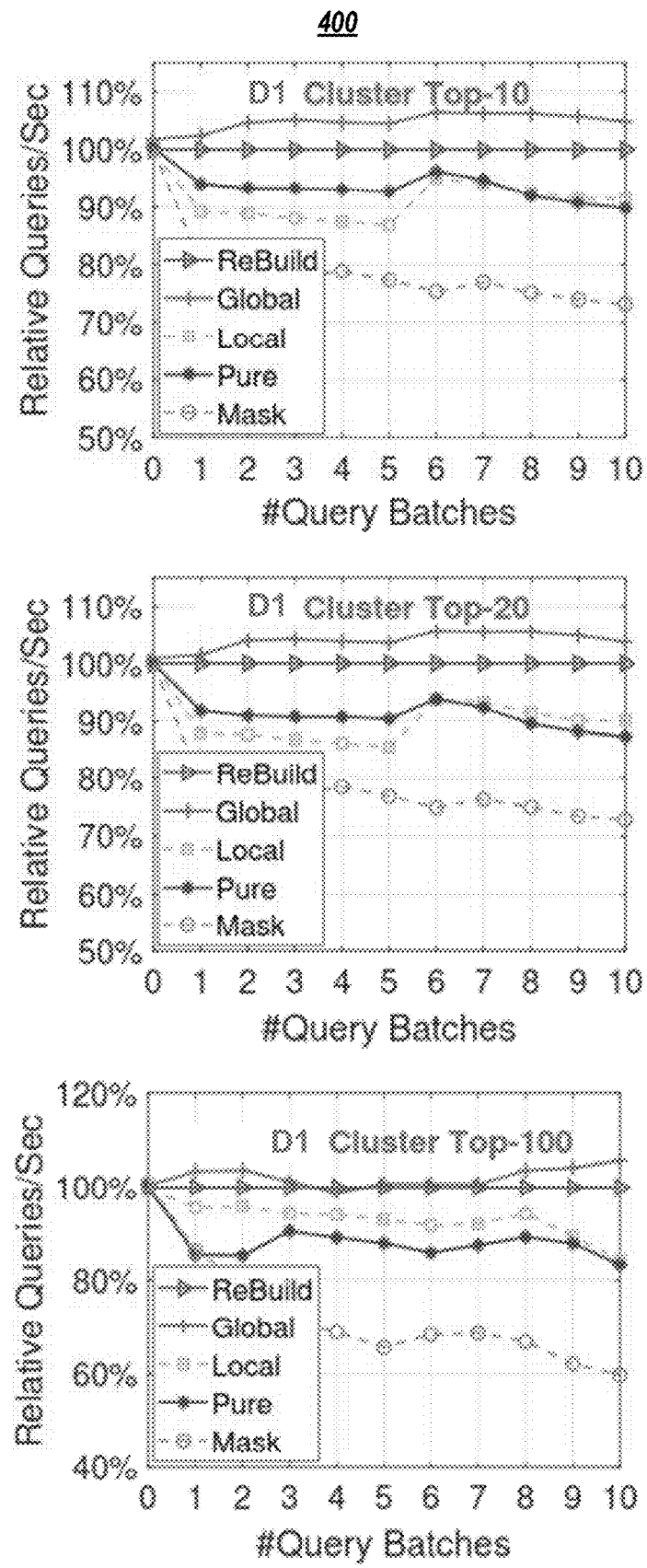
Figure 4C:
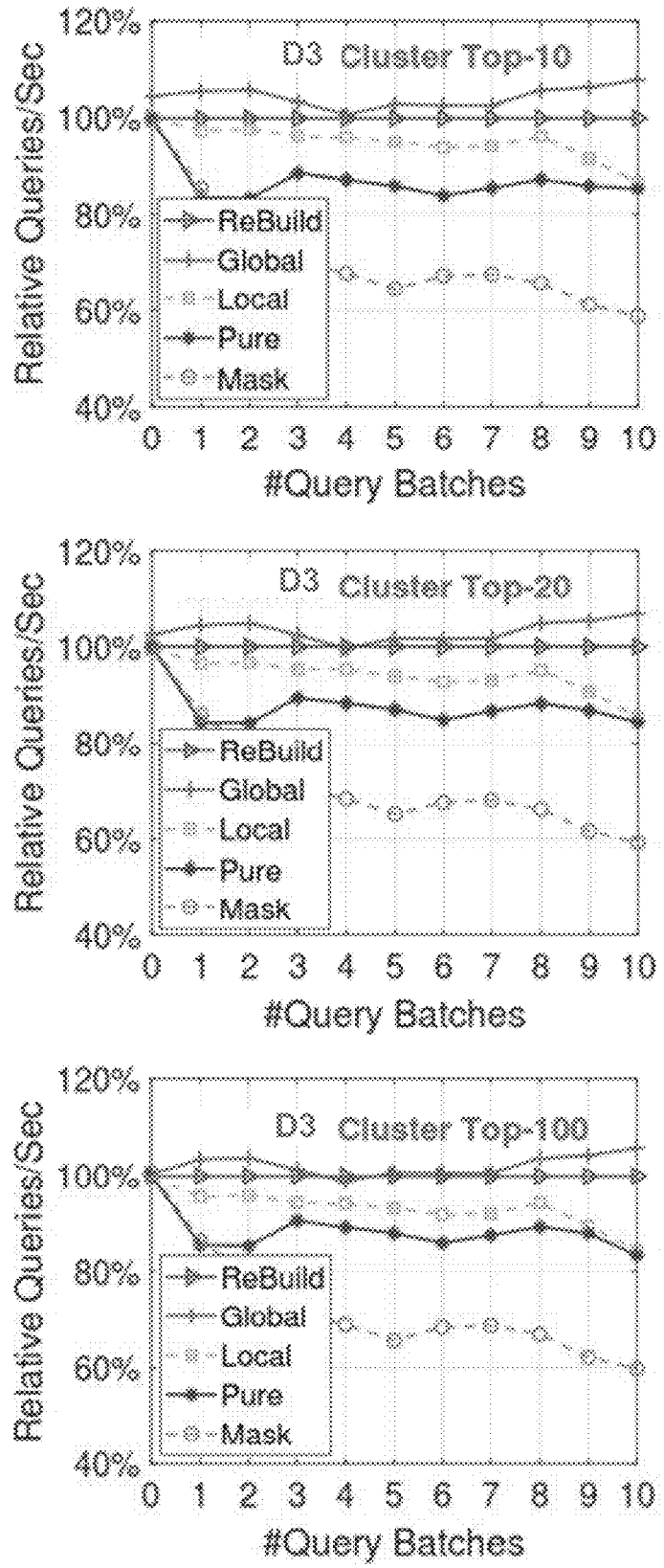

FIG. 3 depicts experimental data for exemplary total execution times versus number of operations. To evaluate the execution time of the global reconnect method and other baselines, the accumulated time is plotted against the number of operations. As depicted, the accumulated time increases as the number of operations increases. The plots at the bottom of FIG. 3 represent less workload execution time and better performance. In these experiments, two major characteristics of real-world scenarios are considered. First, embedding vectors of different usernames are a much larger group than online product embeddings. Therefore, the number of queries may be greater or equal to the number of vectors in the database. Second, a single user may look for products several times within an hour. Thus, one query vector may be executed, e.g., hundreds of times. Combining these two features, the original workload for the first dataset may be modified. For example, given 900 k base vectors, 10 k vectors may be removed in every step of the workload, and the same amount of vectors may be inserted but queried with 200 k, 1 million, 2 million, and 20 million vectors. The query set may be obtained by duplicating the original 10 k query set. Plots for these four workloads correspond to the sub-figures in FIG. 3.

The top sub-figure on the left in FIG. 3 shows that if 200 k vectors are queried per batch, graph reconstruction has the highest time cost, which is due to the time cost introduced by resetting all vertices on the graph. In that case, the vertex masking is relatively time inefficient. Although vertex masking deletes vertices in the fastest way, the significant QPS drop in the query phase makes it time-consuming. The global reconnect, local reconnect, and pure deletion methods have similar total execution times. Global reconnect and local reconnect have higher execution time due to the cost introduced by reconnection. As shown in FIG. 3, as the number of queries per batch increases, the global reconnect method achieves the lowest total execution time.

This phenomenon validates the assumption that the time cost of updating may be amortized by the time saved using an efficient ANN search. The same compensation effect is also observed in graph reconstruction and local reconnect methods. As the number of queries increases for each batch, the total execution time of the graph reconstruction method outperforms vertex masking and becomes closer to the pure deletion method. The performance of local reconnect also improves as the margin between local reconnect and pure deletion increases when the number of queries increases. Therefore, in real-world applications that require online ANN search, given the large amount of query requests, the proposed IPGM framework outperforms static proximity graph-based methods due to the advantages taken in each search phase. Meanwhile, IPGM reduces the latency of data deletion by avoiding reindexing the whole dataset as a graph in each step.

3. Some Discussions

To obtain a level of recall at 0.8, the proposed global reconnect method improves the performance of incremental proximity graph in online ANN search by 10.6% on average. In some scenarios, the global reconnect method also outperforms graph reconstruction by up to 18.8%.

The global reconnect method embodiments are robust to random update patterns and clustered update patterns. In clustered update when a vector and its nearest neighbors are deleted together, the global reconnect method is a better way to maintain a good approximation to the Delaunay Graph.

The global reconnect method embodiments reduce the total execution time when the number of queries increases. In real-world settings where the number of queries and data vectors are at the same level, these embodiments have the fastest execution time compared with other methods.

C. Some Conclusions or Observations

Graph-based ANN search methods index a dataset as a proximity graph and have shown superiority over other ANN search approaches. However, the inefficiency of a proximity graph against incremental data vector insertion and deletion prevents it from being used in large-scale online ANN search. Various embodiments herein present proximity graph maintenance methods for online ANN search. The incremental proximity graph update problem is formally defined, and theoretical proofs are provided to demonstrate the feasibility of incremental vertex insertion and deletion on the proximity graph. Four proximity graph update methods are presented to preserve the advantages of a proximity graph in ANN search when vertices are removed from the graph in different patterns. Experimental data on four benchmark ANN datasets show that embodiments herein outperform a reconstruction baseline by up to 18.8%. Various updating schemes advantageously eliminate the performance drop in online ANN methods on proximity graphs, which enables the deployment in real-world online applications, such as search engines and recommendation systems.

D. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 5:
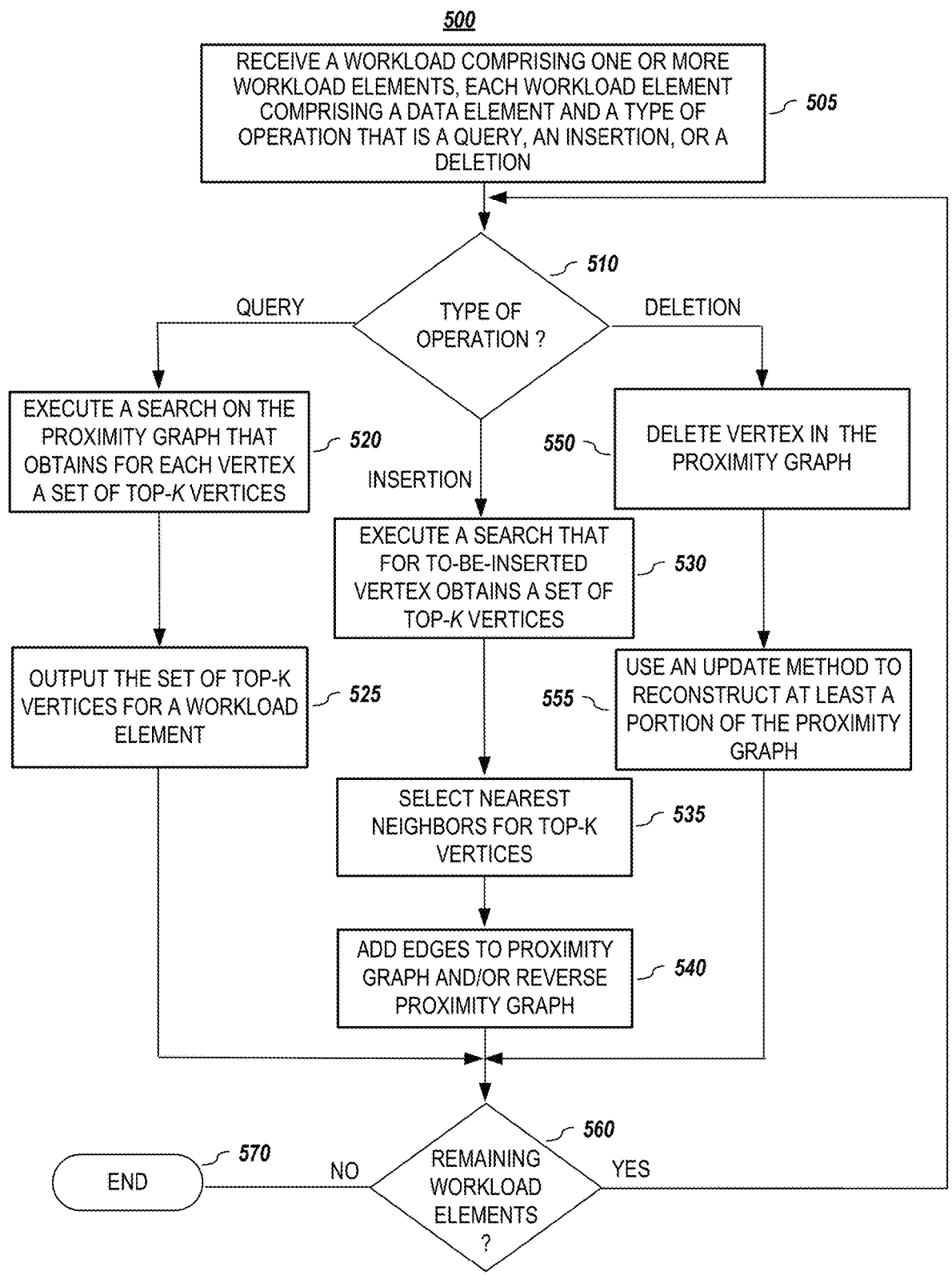
FIG. 5 depicts a flowchart for a process for updating a directed proximity graph, according to embodiments of the present disclosure.

FIG. 5 depicts a flowchart for a process for updating a directed proximity graph according to embodiments of the present disclosure. In one or more embodiments, process 500 may begin once a workload, which represents a set of vertices in a proximity graph, is received (505). Each vertex may be associated with a type of operation that comprises at least one of a query, insertion, or deletion. In response to the type of operation comprising a query, a search on the proximity graph may be executed (520) to obtain for each vertex a set of top-K vertices, and the set of top-K vertices may be output (525). Process 500 may then determine (560) whether there are any remaining workloads and, if so, process 500 may resume with ascertaining (510) the type of operation for the next item in the workload. Otherwise, process 500 may end (570).

In one or more embodiments, in response to the type of operation comprising an insertion, a search on the proximity graph may be executed (530) to obtain for each vertex a set of top-K vertices; nearest neighbors for the top-K vertices may be selected (535); and edges may be added (540) to the proximity graph and/or the reverse proximity graph. As in the case of a query, process 500 may resume with ascertaining (510) the type of operation for the next item in the workload and, otherwise, process 500 may end (570).

In one or more embodiments, in response to the type of operation comprising a deletion, one or more vertices in the set of vertices may be deleted (550) and an update method may be used to reconstruct (555) at least a portion of the proximity graph. Process 500 may, again, resume with ascertaining (510) the type of operation for the next item in the workload or end (570) if there are no items left in the workload.

Figure 6:
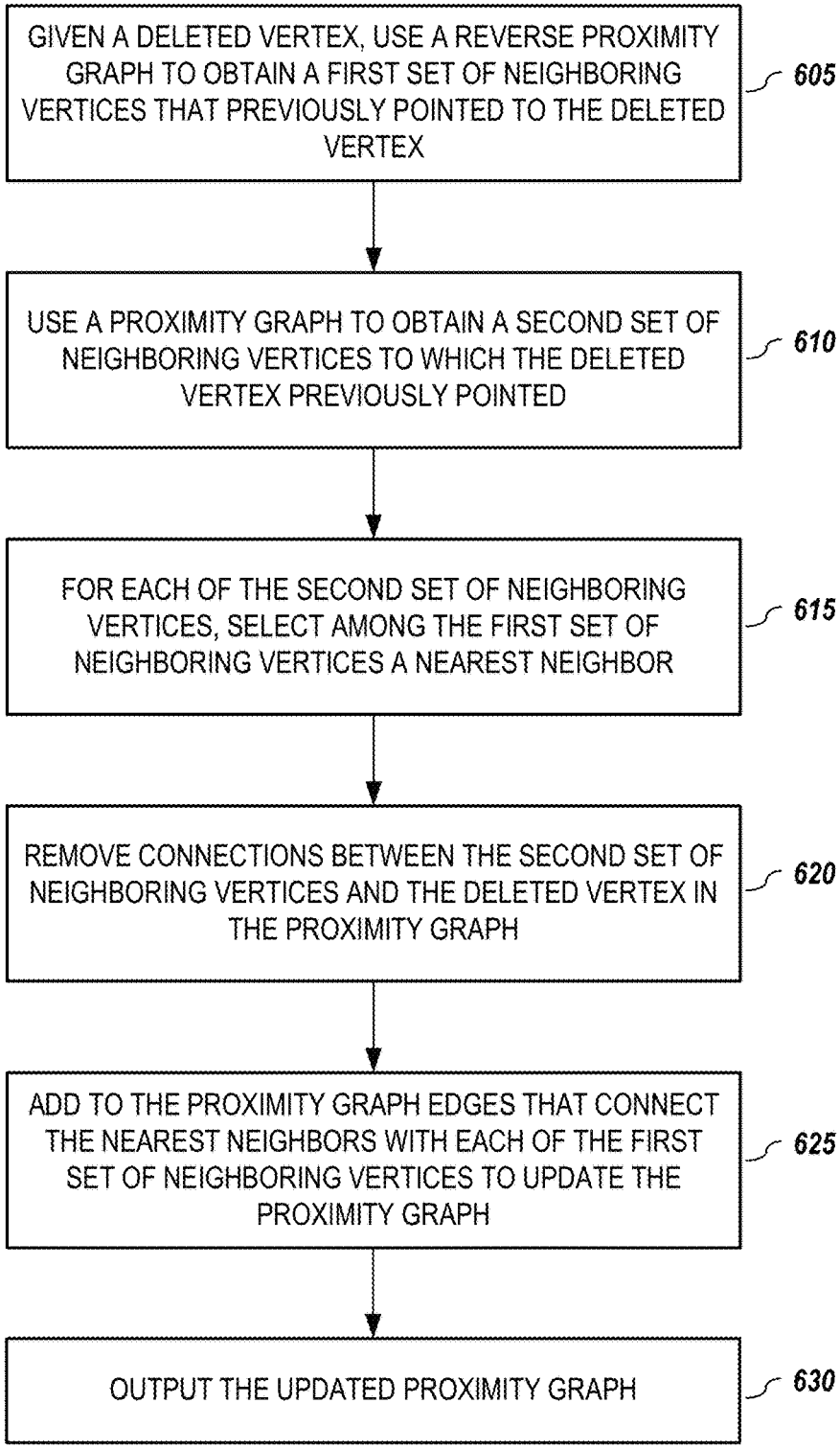
FIG. 6 depicts a flowchart for a process for updating a directed proximity graph using a local reconnection method according to embodiments of the present disclosure.

FIG. 6 depicts a flowchart for a process for updating a directed proximity graph using a local reconnection method according to embodiments of the present disclosure. In one or more embodiments, process 600 may begin when, given a deleted vertex, a reverse proximity graph is used (605) to obtain a first set of neighboring vertices that previously pointed to the deleted vertex. In one or more embodiments, a proximity graph may be used to obtain (610) a second set of neighboring vertices to which the deleted vertex previously pointed. For each of the second set of neighboring vertices, a nearest neighbor may be selected (615) among the first set of neighboring vertices. In one or more embodiments, connections between the second set of neighboring vertices and the deleted vertex may be removed (620) in the proximity graph and/or the reverse proximity graph, and edges that connect the nearest neighbors with each of the first set of neighboring vertices may be added (625) to update the proximity graph, which may then be output (630).

Figure 7:
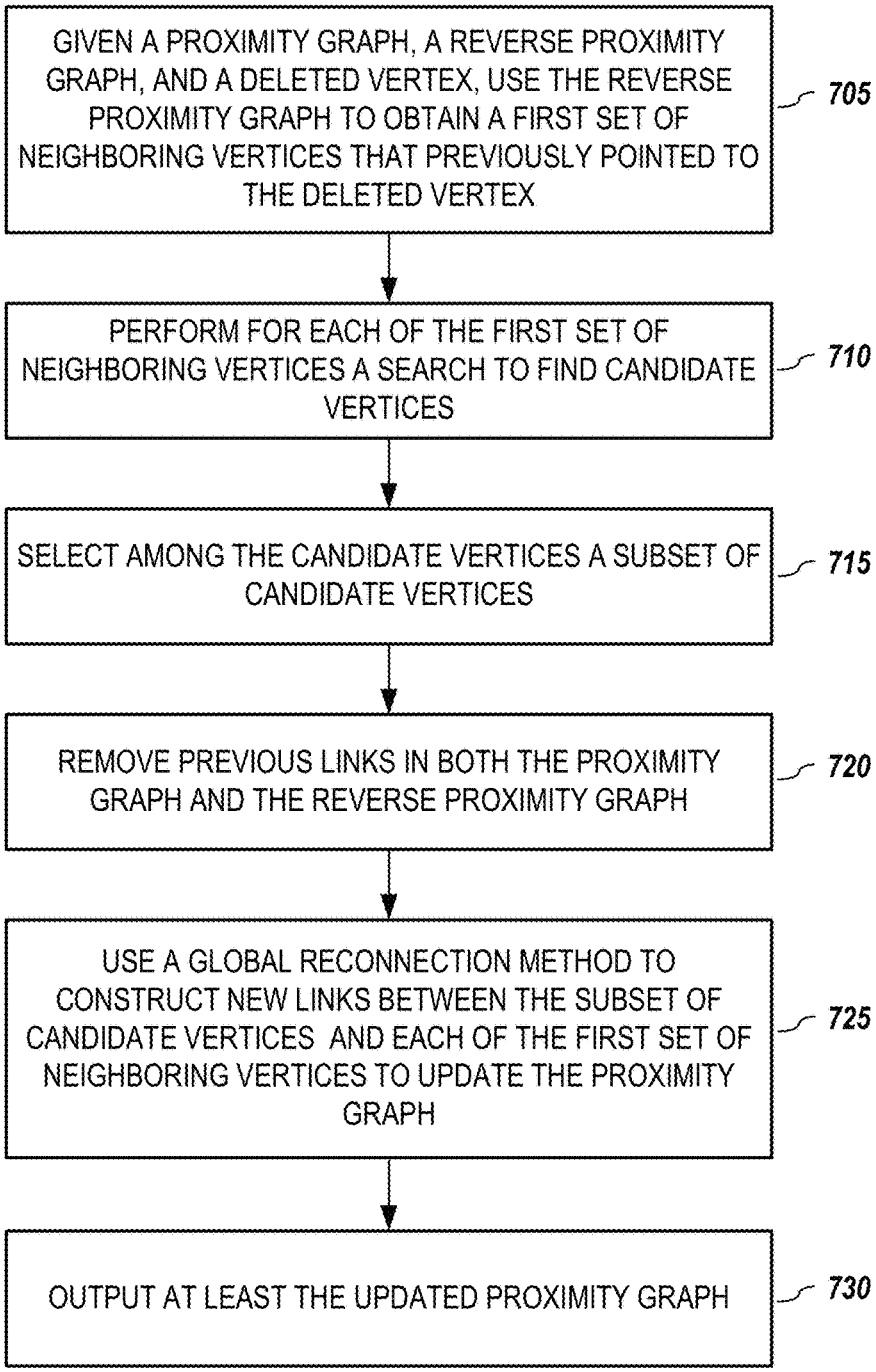
FIG. 7 depicts a flowchart for a process for updating a directed proximity graph using a global reconnection method according to embodiments of the present disclosure.

FIG. 7 depicts a flowchart for a process for updating a directed proximity graph using a global reconnection method according to embodiments of the present disclosure. In one or more embodiments, process 700 may begin when, given a proximity graph, reverse proximity graph, and deleted vertex, the reverse proximity graph is used to obtain (705) a first set of neighboring vertices that previously pointed to the deleted vertex. For each of the first set of neighboring vertices, a search (710) may be performed to find candidate vertices. In one or more embodiments, a subset of candidate vertices may be selected (715) among the candidate vertices, and previous links in both the proximity graph and the reverse proximity graph may be removed (720).

In one or more embodiments, a global reconnection method may be used (725) to construct new links between the subset of candidate vertices and each of the first set of neighboring vertices to update the proximity graph. Finally, the updated proximity graph and/or the reverse proximity graph may be output (730).

One skilled in the art shall recognize that: (1) certain steps herein may optionally be performed; (2) steps may not be limited to the specific order set forth herein; (3) certain steps may be performed in different orders; and (4) certain steps may be done concurrently.

Figure 8:
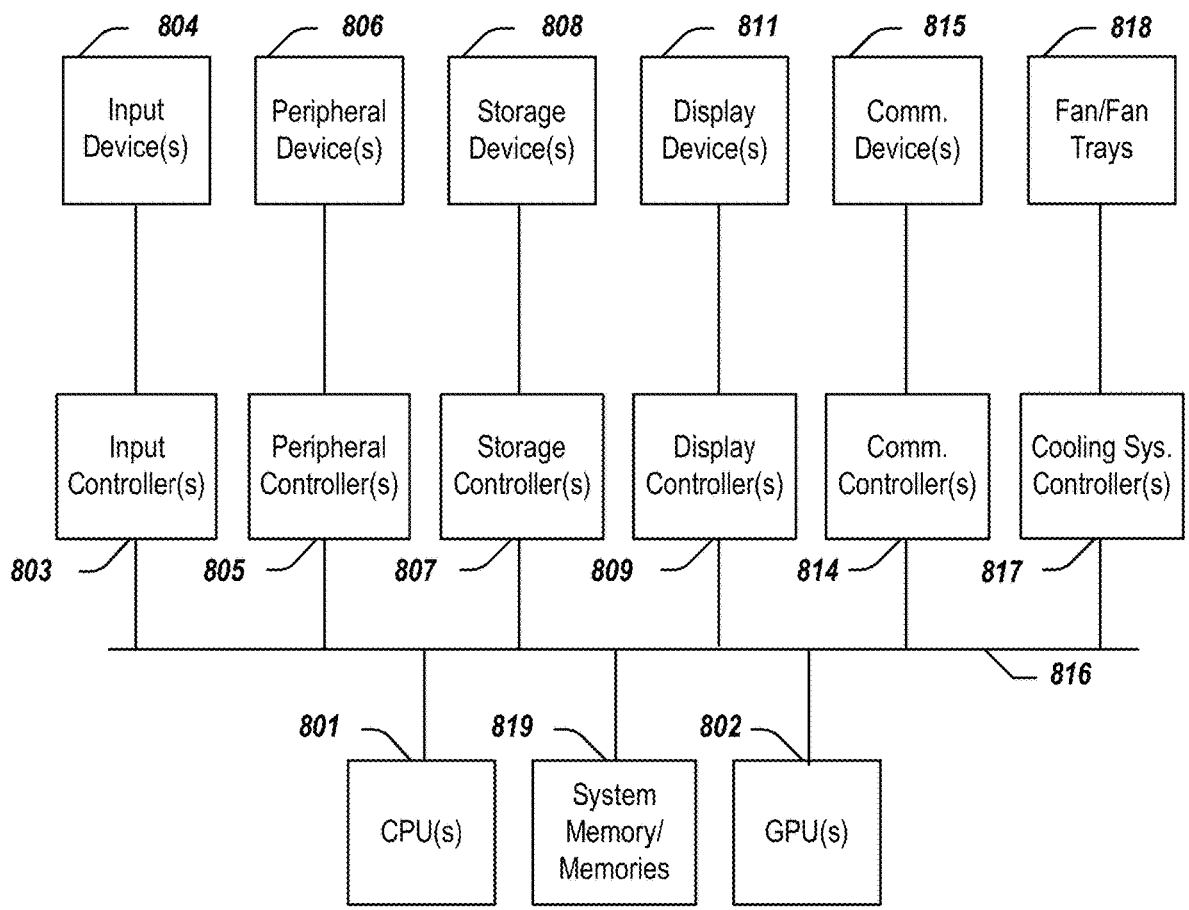
FIG. 8 depicts a simplified block diagram of a computing device/information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components than as depicted in FIG. 8.

As illustrated in FIG. 8, the computing system 800 includes one or more CPUs 801 that provides computing resources and controls the computer. CPU 801 may be implemented with a microprocessor or the like, and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A system for using an updating directed proximity graph, the system comprising:
   one or more processors; and
   a non-transitory computer-readable medium or media comprising one or more sets of instructions which, when executed by at least one of the one or more processors, causes steps to be performed comprising:
   given a query, searching an updated proximity graph using the query and a measurement function that takes as an input the query to identify a set of data elements relevant to the query, in which the set of data elements correspond to a set of vertices in the updated the proximity graph that are identified as being relevant to the query based upon measurement function values, and in which the updated proximity graph was obtained using steps comprising:
   given a deleted vertex in a proximity graph, using a reverse proximity graph to obtain a first set of neighboring vertices that previously pointed to the deleted vertex;
   using the proximity graph to obtain a second set of neighboring vertices to which the deleted vertex previously pointed;
   for each vertex of the first set of neighboring vertices:
   selecting among the second set of neighboring vertices a set of nearest neighbors;
   removing connections between the vertex of the first set of neighboring vertices and the deleted vertex in the proximity graph; and
   adding, to the proximity graph, edges that connect each nearest neighbor from the set of nearest neighbors with the vertex to update the proximity graph; and
   outputting the updated proximity graph; and
   outputting the set of data elements that are relevant to the query.

2. The system according to claim 1, further comprising adding edges to the reverse proximity graph to update the reverse proximity graph, and outputting the updated reverse proximity graph.

3. The system according to claim 1, wherein the set of data elements corresponding to vertices in the updated the proximity graph are a set of top-k data elements corresponding to top-k nearest neighbors of the query in the updated the proximity graph.

4. The system according to claim 1, further comprising using a reverse proximity graph to obtain incoming links on the proximity graph for the deleted vertex.

5. The system according to claim 1, further comprising using a greedy search that comprises maintaining a priority queue that comprises at its top a vertex that maximizes a measurement function.

6. A non-transitory computer-readable medium or media comprising one or more sequences of instructions which, when executed by at least one processor, causes steps to be performed comprising:
   given a query, searching an updated proximity graph using the query and a measurement function that takes as an input the query to identify a set of data elements relevant to the query, in which the set of data elements correspond to a set of vertices in the updated the proximity graph that are identified as being relevant to the query based upon measurement function values, and in which the updated proximity graph was obtained using steps comprising:
   given a proximity graph, a reverse proximity graph, and a deleted vertex, using the reverse proximity graph to obtain first set of neighboring vertices that previously pointed to the deleted vertex;
   performing, for each of the first set of neighboring vertices, a search to find candidate vertices;
   selecting among the candidate vertices a subset of candidate vertices;
   removing previous links in both the proximity graph and the reverse proximity graph;
   using a reconnection method to construct new links between the subset of candidate vertices and each of the first set of neighboring vertices to at least update the proximity graph; and
   outputting at least the updated proximity graph; and
   outputting the set of data elements that are relevant to the query.

7. The non-transitory computer-readable medium or media according to claim 6, wherein updating the proximity graph comprises updating edges of neighboring vertices that point to a previous vertex in the proximity graph to obtain an updated proximity graph.

8. The non-transitory computer-readable medium or media according to claim 6, wherein the deleted vertex is excluded from being a member of the candidate vertices at least when selecting the subset of candidate vertices.

9. The non-transitory computer-readable medium or media according to claim 6, further comprising adding edges to the reverse proximity graph to update the reverse proximity graph and outputting the updated reverse proximity graph.

10. The non-transitory computer-readable medium or media according to claim 6, wherein the set of data elements corresponding to vertices in the updated the proximity graph are a set of top-k data elements corresponding to top-k nearest neighbors of the query in the updated the proximity graph.

11. The non-transitory computer-readable medium or media according to claim 10, wherein the search is at least one of a beam search or a greedy search that comprises maintaining a priority queue that comprises at its top a vertex that maximizes a measurement function.

12. A computer-implemented method comprising:
receiving a workload element comprising a query and an operation type identified as query;
executing a search, for the query, that obtains a set of top-k candidate data elements from an updated proximity graph, in which the updated proximity graph was obtained using steps comprising:
receiving a workload comprises a set of workload elements, in which each workload element comprises a data element and an operation type; and
for each workload element in the workload in which the data element of the workload element corresponds to an expired vertex in a proximity graph and in a reverse proximity graph and the operation type is a deletion, performing at least one of set of deletion-related methods comprising:
a first reconnection method comprising:
using the reverse proximity graph to obtain a first set of vertices that are outgoing neighbors of the expired vertex;
using the proximity graph to obtain a second set of vertices that are outgoing neighbors of the expired vertex; and
for each vertex in the first set of vertices:
obtaining a set of neighbors for the vertex from among the second set of vertices;
removing edges in the proximity graph and in the reverse proximity graph between the vertex and the expired vertex; and
for each neighbor in the set of neighbors for the vertex, adding edges to the proximity graph and to the reverse proximity graph that connects the neighbor with the vertex; or a second reconnection method comprising:
using the reverse proximity graph to obtain a first set of vertices that are outgoing neighbors of the expired vertex; and
for each vertex in the first set of vertices:
obtaining a set of candidate neighbors for the vertex;
obtaining a set of neighbors for the vertex from among the set of candidate neighbors for the vertex;
removing edges in the proximity graph and in the reverse proximity graph between the vertex and the expired vertex; and
for each neighbor in the set of neighbors for the vertex, adding edges to the proximity graph and to the reverse proximity graph; and
outputting the set of data elements that are relevant to the query.

13. The computer-implemented method of claim 12, wherein the step of outputting the set of data elements that are relevant to the query comprises:
outputting a set of top-k data elements corresponding to top-k nearest neighbors of the query in the updated proximity graph.

14. The computer-implemented method of claim 12, wherein the step of obtaining a set of candidate neighbors for the vertex comprises using at least one of a beam search or a greedy search.

15. The computer-implemented method of claim 14, wherein using a greedy search comprises maintaining a priority queue that comprises at its top a vertex that maximizes a measurement metric.

16. The computer-implemented method of claim 12, further comprising:
responsive to a workload element of the workload comprising an operation type that is an insertion and an insertion data element, executing a search, for a vertex to be inserted corresponding to the insertion data element, that obtains an insertion-related set of top-k candidate data elements.

17. The computer-implemented method according to claim 16, further comprising:
using the insertion-related set of top-k candidate data elements to select a set of N nearest neighbors of the vertex to be inserted; and
adding edges to at least the proximity graph or to the updated proximity graph.

18. The computer-implemented method according to claim 12, wherein the set of deletion-related methods further comprises a vertex masking method.

19. The computer-implemented method according to claim 12, wherein the step of for each neighbor in the set of neighbors for the vertex, adding edges to the proximity graph and the reverse proximity graph comprises not adding edges to the proximity graph and the reverse proximity graph for a neighbor in the set of neighbors that is the expired vertex.

* * * * *